(12) United States Patent
Carelli et al.

(10) Patent No.: US 8,588,968 B2
(45) Date of Patent: *Nov. 19, 2013

(54) INTERNET-ACCESSIBLE PET TREAT DISPENSING SYSTEM AND METHOD

(76) Inventors: Dominic Anthony Carelli, Summerville, SC (US); Dominic Matthew Carelli, Summerville, SC (US)

( * ) Notice: Subject to any disclaimer, the term of this patent is extended or adjusted under 35 U.S.C. 154(b) by 125 days.

This patent is subject to a terminal disclaimer.

(21) Appl. No.: 13/135,472

(22) Filed: Jul. 6, 2011

(65) Prior Publication Data

US 2013/0013106 A1    Jan. 10, 2013

(51) Int. Cl.
*A01K 1/035*    (2006.01)
*G06F 17/00*    (2006.01)

(52) U.S. Cl.
USPC ............................ 700/244; 221/268; 221/270

(58) Field of Classification Search
USPC .......... 221/194, 238, 263, 268, 270; 700/241, 700/244
See application file for complete search history.

(56) References Cited

U.S. PATENT DOCUMENTS

| | | | |
|---|---|---|---|
| 5,078,097 A * | 1/1992 | Chisholm | 119/51.13 |
| 5,148,944 A * | 9/1992 | Kaufman et al. | 221/131 |
| 6,367,417 B1 * | 4/2002 | Gal et al. | 119/51.5 |
| 6,571,988 B2 | 6/2003 | Bowen | |
| 6,601,039 B1 | 7/2003 | Kolls | |
| 6,604,087 B1 | 8/2003 | Kolls | |
| 6,606,602 B1 | 8/2003 | Kolls | |
| 6,886,715 B2 | 5/2005 | Lennox | |
| 6,904,868 B2 * | 6/2005 | Block et al. | 119/51.12 |
| 7,052,728 B2 | 5/2006 | Kateman et al. | |
| D540,389 S | 4/2007 | Melanson | |
| 7,270,080 B1 * | 9/2007 | Kane | 119/51.01 |
| 7,353,079 B2 | 4/2008 | Rodriguez | |
| 7,434,541 B2 * | 10/2008 | Kates | 119/720 |
| 7,654,230 B2 * | 2/2010 | Kroll | 119/712 |
| 7,837,058 B2 | 11/2010 | Collins et al. | |
| 7,885,272 B2 | 2/2011 | Burger et al. | |
| 7,896,243 B2 | 3/2011 | Herskovitz | |
| 7,899,070 B2 | 3/2011 | Thibault et al. | |
| 7,912,580 B2 | 3/2011 | Walker et al. | |
| 7,912,581 B2 | 3/2011 | Walker et al. | |
| 8,113,148 B2 * | 2/2012 | Chem | 119/500 |
| 2003/0026876 A1 | 2/2003 | Albuja et al. | |
| 2004/0182876 A1 | 9/2004 | Lennox | |
| 2004/0194714 A1 | 10/2004 | Lee | |

(Continued)

OTHER PUBLICATIONS http://www.dyndns.com.

*Primary Examiner* — Timothy Waggoner

(57) ABSTRACT

A system and method for remotely dispensing a pet treat using an Internet-accessible treat dispensing apparatus includes: (1) providing a dispensing apparatus including: a treat dispensing unit with a mechanism for sliding a delivery plate over a stationary base plate; a control circuit electronics portion in communication with the sliding mechanism and with a router or a local computer, which is in communication with at least one remote Internet-accessible electronic device; and video camera portion(s); (2) providing a webpage or website that can be viewed using the local computer or the Internet-accessible electronic device; (3) displaying a prompt on the webpage for inputting user information; (4) displaying a control block with a treat button for dispensing the treat; (5) initiating a video camera view; (6) displaying a delay button for delaying the treat; and (7) sending a signal to initiate the sliding mechanism, followed by automatically dispensing the treat. This simplified abstract is not intended to limit, and should not be interpreted as limiting, the scope of the claims.

16 Claims, 16 Drawing Sheets

(56) References Cited

U.S. PATENT DOCUMENTS

| | | |
|---|---|---|
| 2004/0210486 A1 | 10/2004 | Carapelli |
| 2005/0102233 A1 | 5/2005 | Park et al. |
| 2011/0018994 A1 | 1/2011 | Russoniello et al. |
| 2011/0139076 A1 | 6/2011 | Pu et al. |

* cited by examiner

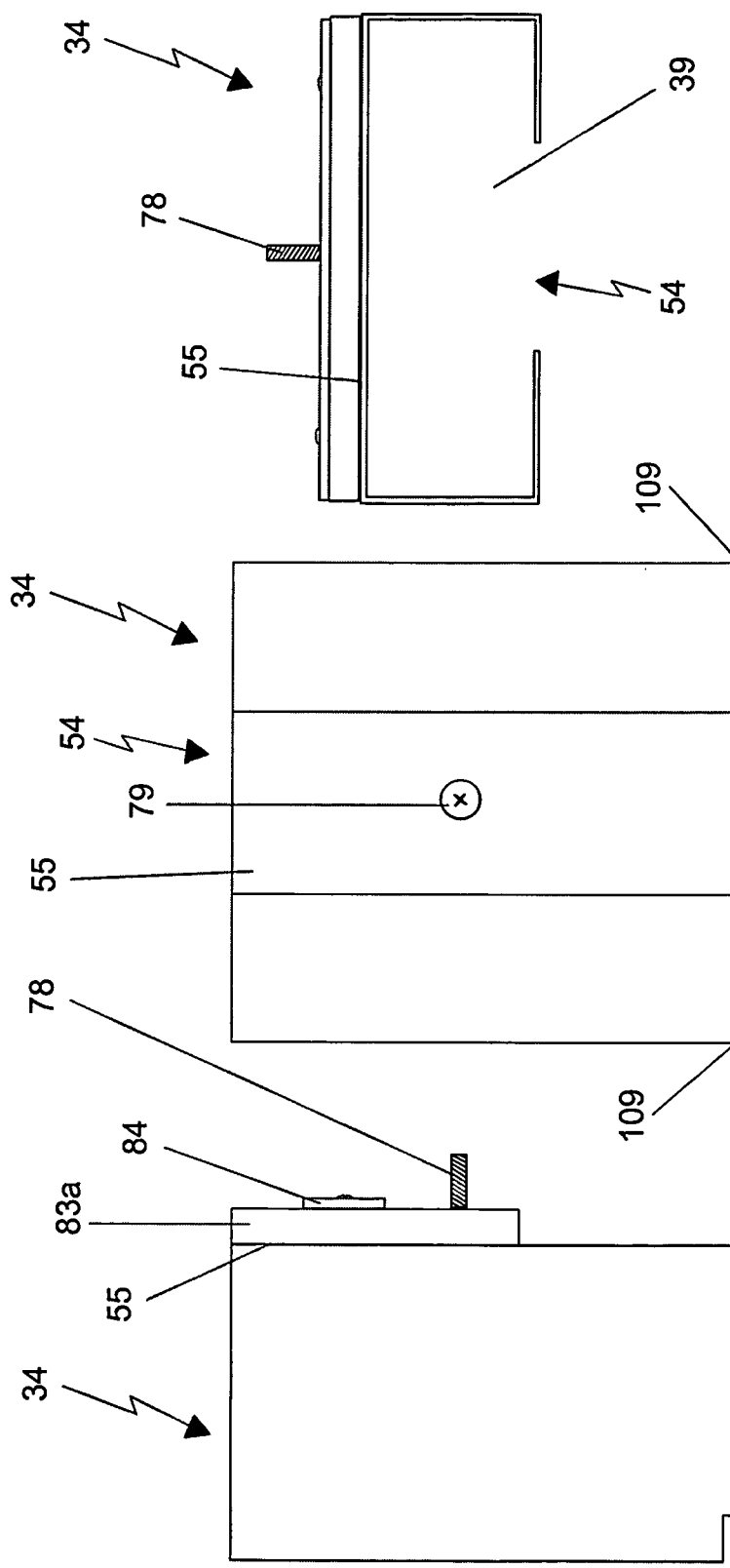

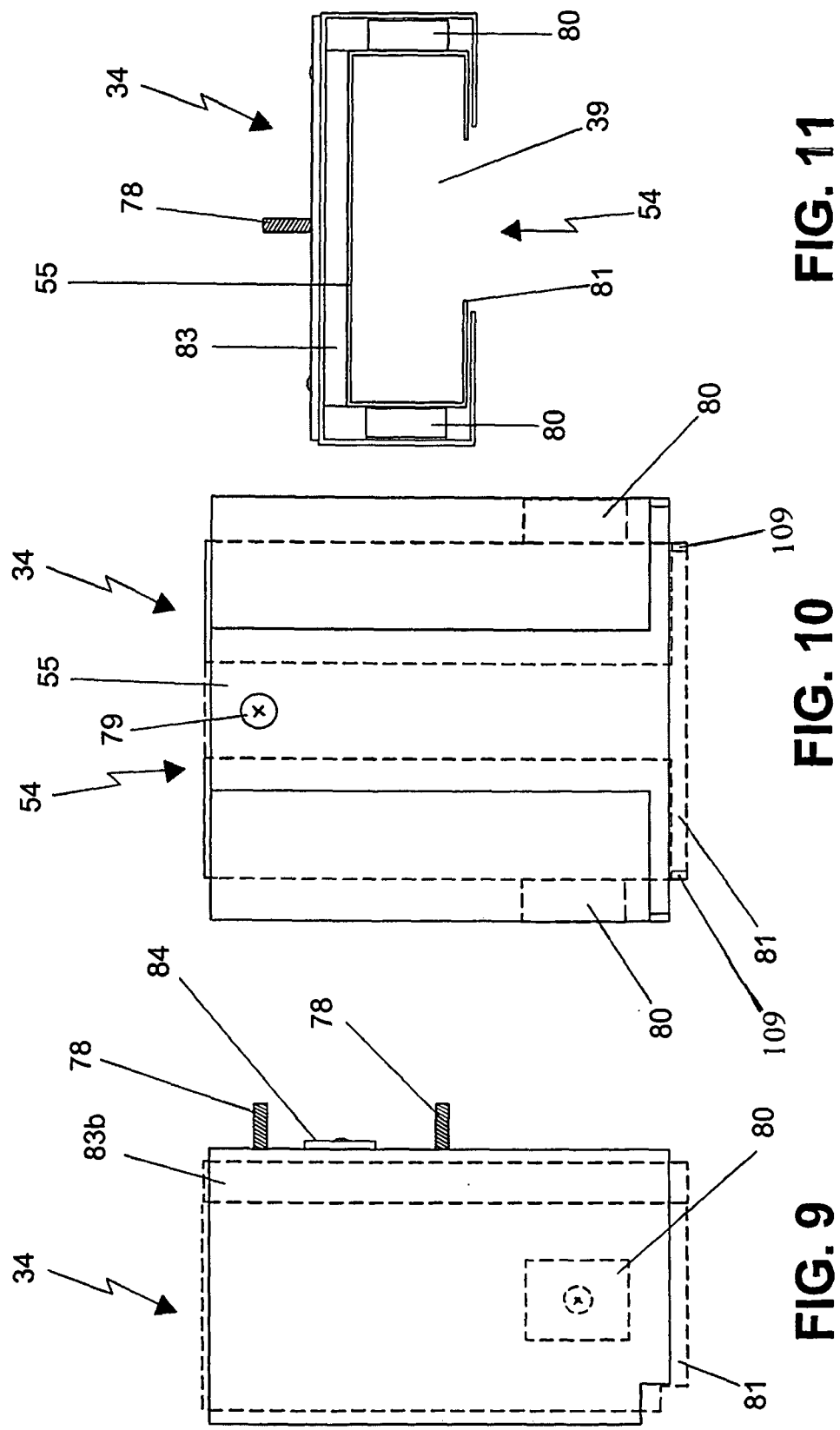

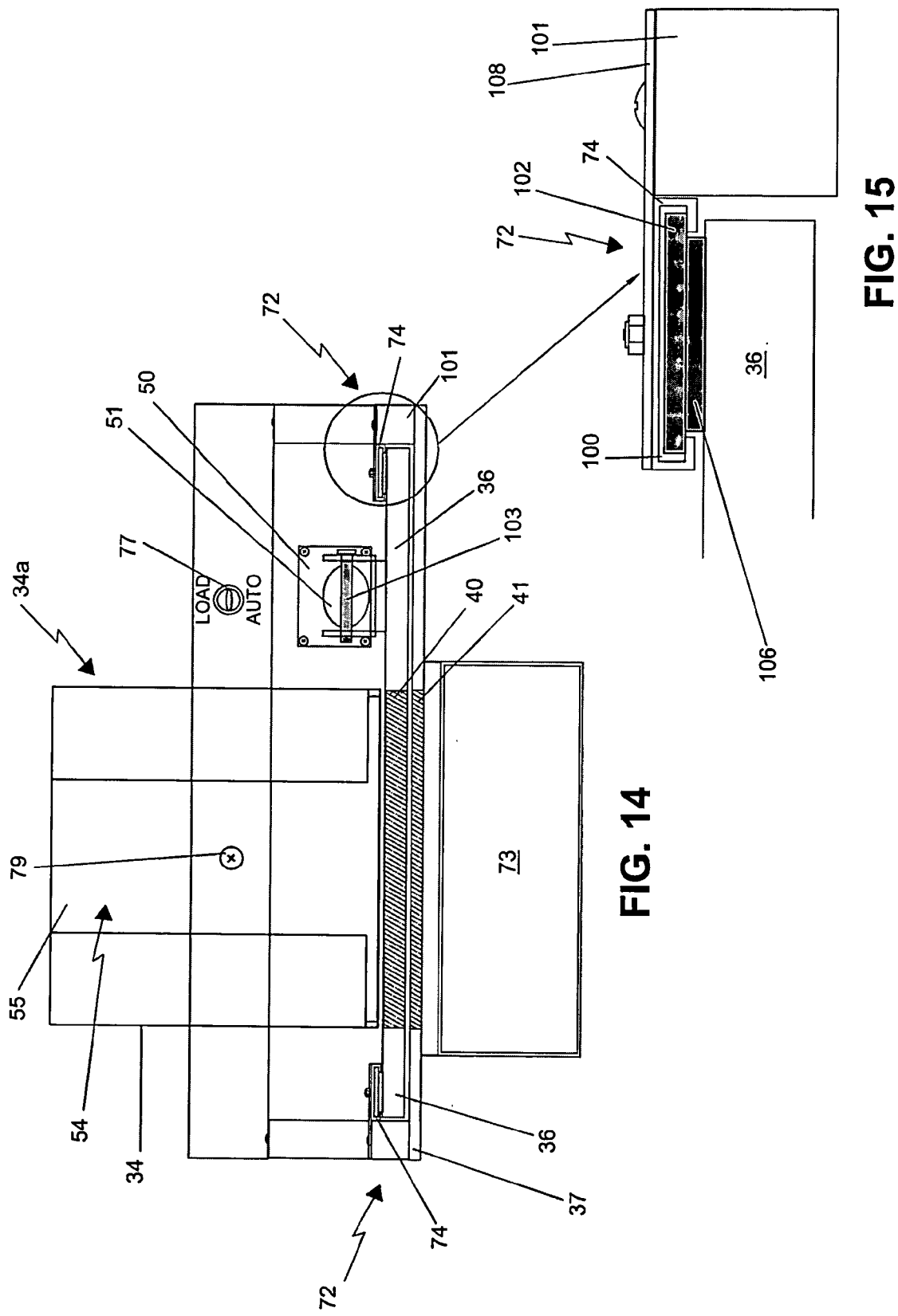

INTERNET-ACCESSIBLE PET TREAT DISPENSING SYSTEM AND METHOD

BACKGROUND OF THE INVENTION

1. Technical Field

The present invention relates to an Internet-accessible pet treat dispensing apparatus for remotely dispensing a pet treat to a pet using an Internet-accessible electronic device.

2. Background Information

All over the world, pets hold a special place in the hearts of their owners. Unfortunately, many pet owners who hold jobs outside the home are not able to see their pets as much as they would like. Many pet owners leave their pets at home for most of the day while they are at their jobs, and some leave their pets at day care facilities on their work days. The same is true of pet owners who must board their pets overnight, or recruit a pet sitter, for several days or weeks while they go on vacation or to graduations and other events away from home throughout the year. Such pet owners would have their concerns alleviated, and derive personal satisfaction, from being able to check in on their dog, cat, or other pet, and even give him or her a daily treat, while the owner is away on vacation, on the job, in the hospital, etc.

The pet treat dispensing apparatus of the present invention permits the pet owner to watch his or her pet wherever the pet is staying anytime the owner wishes. The pet treat dispensing apparatus and method of the present invention can be used no matter where the pet owner is, so long as the pet owner has access to a laptop or other Internet-accessible electronic device. The Internet-accessible electronic device is used to access a local computer with which the treat dispensing apparatus of the present invention is in communication. The pet owner (which term includes any owner appointees) employs the treat dispensing apparatus of the present invention to observe the pet and/or give the pet a treat wherever the pet is staying, such as at a day care center, a pet sitter's house, a veterinarian's office, the owner's/pet's home, grandma's house, or a veterinarian hospital. The pet treat dispensing apparatus of the present invention can also include a screen for the pet to observe the pet owner, and an audio portion for the pet to hear the pet owner's voice, or for the owner to hear the pet.

BRIEF SUMMARY OF THE INVENTION

The present invention is a pet treat dispensing method comprising the following steps: (1) providing at a pet site at least one Internet-accessible pet dispensing apparatus comprising: (a) a treat dispensing unit comprising a slidable delivery plate, a stationary base plate below the delivery plate, and a mechanism for sliding the delivery plate over the base plate; (b) a control circuit electronics portion attached to the treat dispensing unit, the control circuit electronics portion being in communication with the mechanism for sliding the delivery plate and with a router or a local computer at the pet site, the router or local computer being in communication with at least one remote Internet-accessible electronic device; and (c) at least one video camera portion in communication with the local computer or the control circuit electronics portion; (2) providing a user-accessible webpage or website that can be viewed using the local computer or the at least one Internet-accessible electronic device; (3) displaying a prompt on the webpage or website for inputting user information to the website; (4) displaying a control block on the webpage or website, the control block comprising a treat button for dispensing the pet treat from the treat dispensing unit; (5) initiating a video camera view from the at least one video camera portion on the display on the local computer or the at least one Internet-accessible device; (6) displaying at least one delay button on the control block for delaying the pet treat until a specified time if the at least one delay button is selected; and (7) once the treat button has been selected, prompting a signal to be sent to the control circuit electronics portion to initiate the mechanism for sliding the delivery plate, followed by automatically dispensing the pet treat from the treat dispensing unit.

The present invention also includes an Internet-accessible dispensing system for remotely distributing a treat to a pet, the pet treat dispensing system comprising: (a) at least two treat dispensing units operating independently of one another, one for each pet treat dispensing apparatus, each treat dispensing unit comprising a treat rack for storing a plurality of pet treats, a delivery plate, a base plate, and a mechanism for sliding the delivery plate over the base plate, a lower opening of the treat rack being positioned over a delivery plate cutout in the delivery plate, the base plate comprising a base plate cutout, each of the treat dispensing units comprising at least a dispensing position wherein the plate cutouts are aligned, and a parked position wherein the plate cutouts are not aligned; (b) a control circuit electronics portion attached to each of the treat dispensing units, each of the control circuit electronics portions comprising an Internet-controlled relay connected to the delivery plate sliding mechanism of a treat dispensing unit; (c) an Internet-accessible local computer in communication with the control circuit electronics portions, and with at least one remote Internet-accessible electronic device; and (d) a video camera portion in communication with the local computer or with the Internet-accessible electronic device, or (d) a router with a built-in Dynamic Domain Name System client that is connected to the at least two portable treat dispensing units and the at least two video camera portions.

Advantages of the system and method of the present invention include the following:

1) The pet owner can reward his or her dog or other pet without leaving work;

2) She can control when her pet is rewarded instead of leaving it up to the pet caretaker;

3) He can control how many extra calories his pet receives, and the time of day he receives it; and 4) She can watch her pet from work, and check in on him or her, particularly when the pet has been acting sick or was previously injured.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein:

FIGS. 6-8 are side elevational, front elevational, and bottom plan views, respectively, of a rack assembly of the treat dispensing unit according to FIG. 5;

FIGS. 9-11 are side elevational, front elevational, and bottom plan views, respectively, of a rack assembly of the treat dispensing unit according to the present invention, shown with a rack insert;

FIG. 14 is a front elevational view of an exemplary embodiment of a treat dispensing unit according to the present invention;

FIG. 15 is a front elevational view of a guide rail assembly of the treat dispensing unit of FIG. 14;

DETAILED DESCRIPTION OF THE INVENTION

Figure 1:
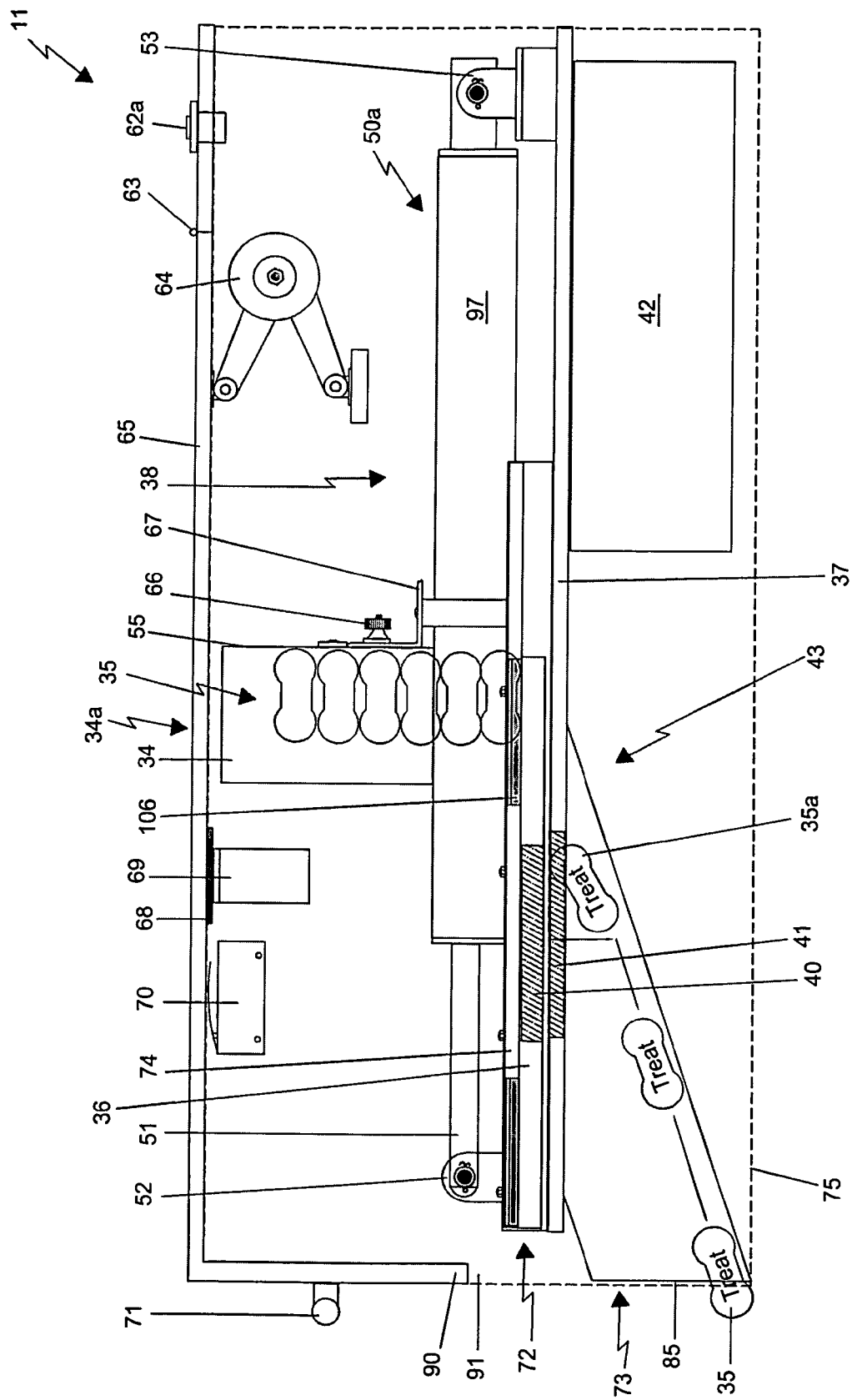
FIG. 1 is a side elevational side view of an exemplary embodiment of a treat dispensing unit according to the present invention, shown in use dispensing a dog treat.

In the following description, like reference characters designate like or corresponding parts throughout the several views. Also, in the following description, it is to be understood that such terms as "front," "back," "within," and the like are words of convenience and are not to be construed as limiting terms. Referring in more detail to the drawings, a device embodying the principles and concepts of the present invention and generally designated by the reference numeral 10 will now be described.

Figure 2:
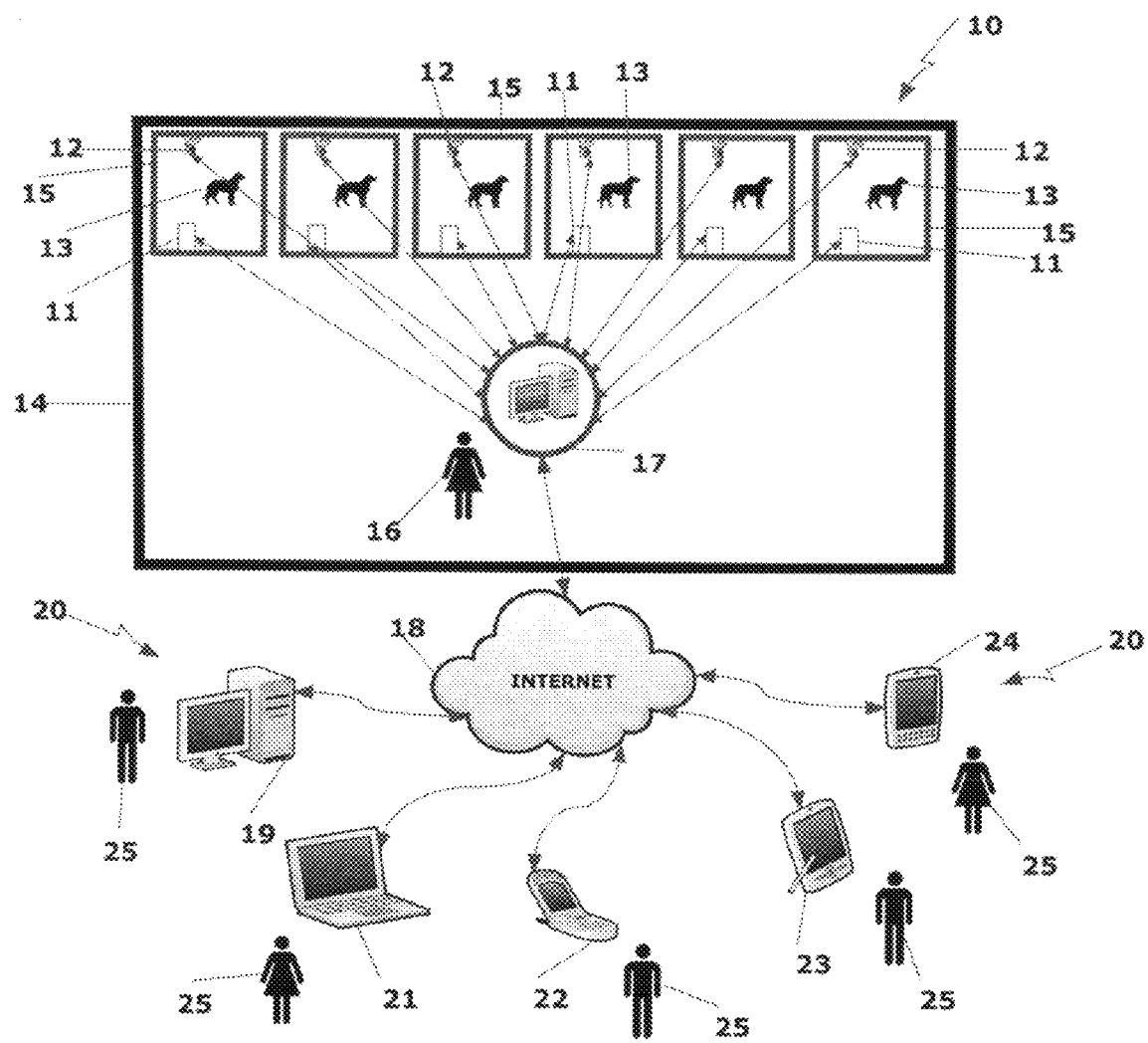
FIG. 2 is a schematic diagram of an exemplary embodiment of an Internet-accessible pet treat dispensing system and apparatus according to the present invention, shown at a pet care facility.
Figure 3:
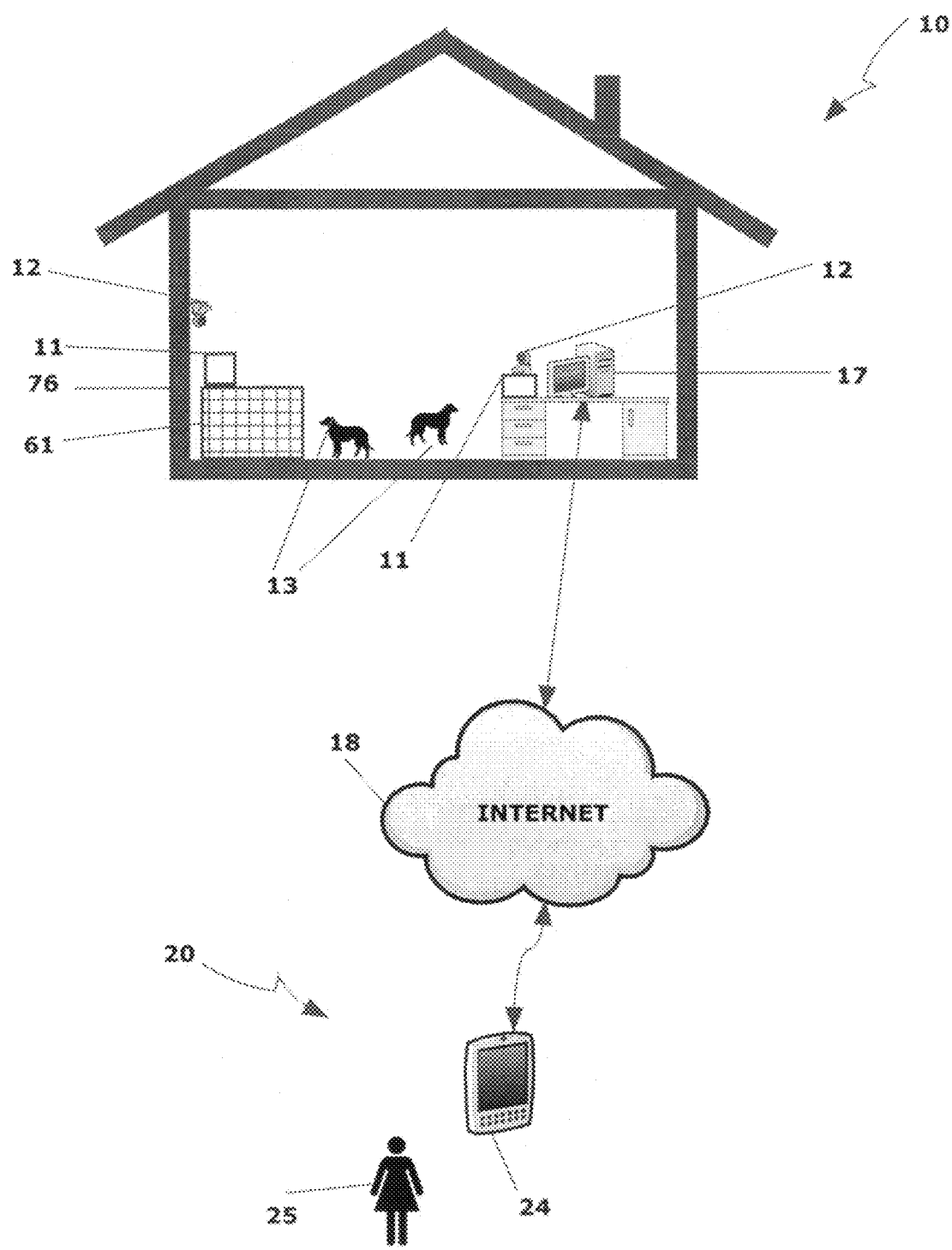
FIG. 3 is a schematic diagram of an exemplary embodiment of an Internet-accessible pet treat dispensing system and apparatus according to the present invention, shown at a home.
Figure 4:
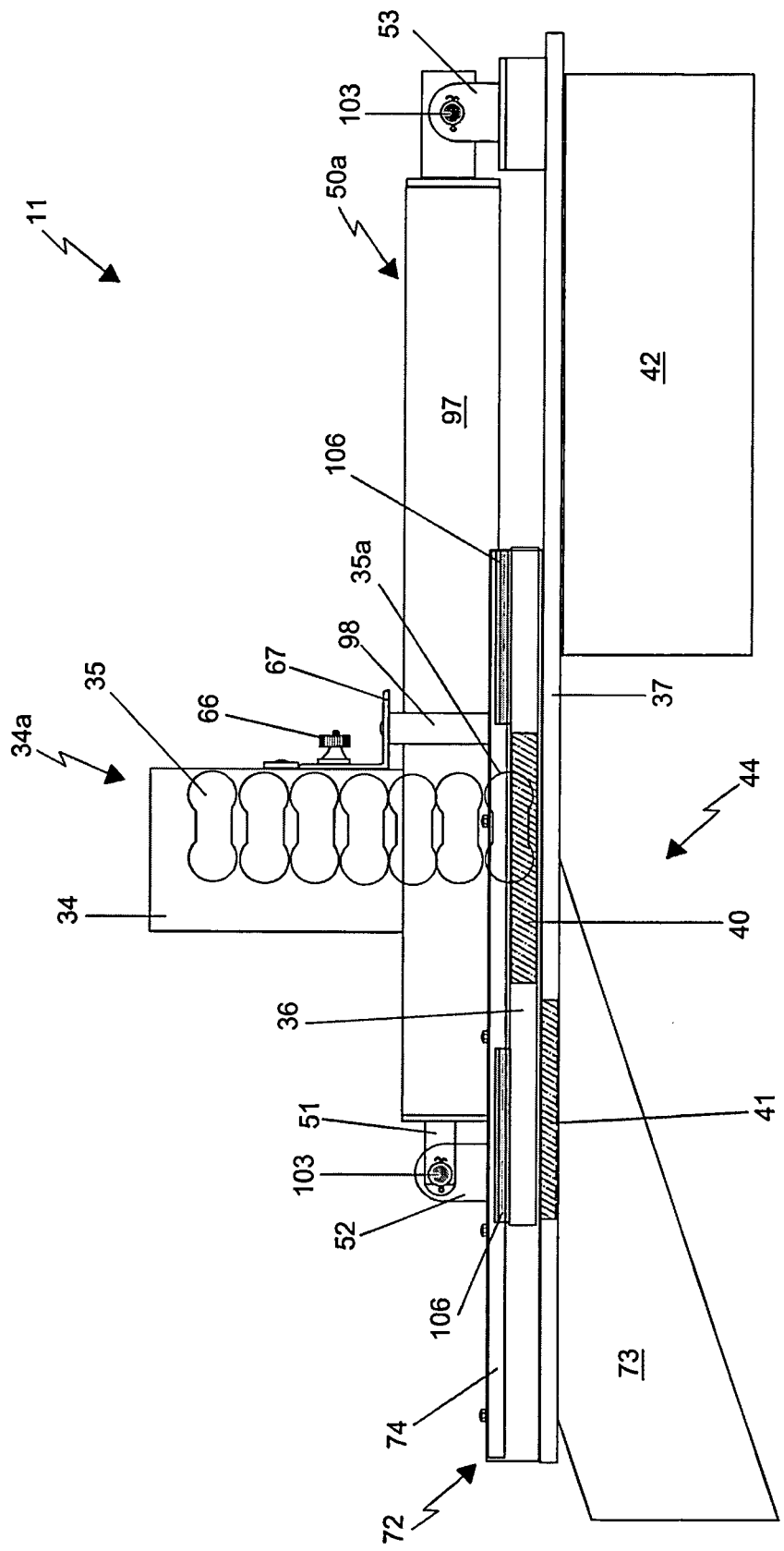
FIG. 4 is a side elevational side view of an exemplary embodiment of a treat dispensing unit according to the present invention, shown in a parked position.

Turning first to FIGS. 1-4, an Internet-accessible pet treat dispensing apparatus 10 comprises: (a) a treat dispensing unit 11 comprising a treat rack 34 for storing a plurality of pet treats 35, a delivery plate 36, a base plate 37, and a mechanism 38 for moving the delivery plate 36 over the base plate 37, the base plate 37 comprising a base plate cutout 41, the delivery plate 36 comprising a delivery plate cutout 40; (b) a control circuit electronics portion 42 attached to the treat dispensing unit 11, the control circuit electronics portion 42 being in communication with the mechanism 38 for moving the delivery plate and with a local computer 17, the local computer 17 being in communication with a remote Internet-accessible electronic device 20; and (c) at least one video camera portion 12 in communication with the local computer 17; wherein the treat dispensing unit 11 comprises at least a dispensing position 43 and a parked position 44, a lower opening 39 of the treat rack 34 (see FIGS. 8 and 10) being positioned over the delivery plate cutout 40 when the treat dispensing unit 11 is in the parked position 44, the plate cutouts 40, 41 being substantially aligned when the treat dispensing unit 11 is in the dispensing position 43 seen in FIG. 1, and not aligned when the treat dispensing unit 11 is in the parked position 44, which is seen in FIG. 4. The plate drive mechanism 38 preferably includes an actuator 50 controlled by the control circuit electronics portion 42, which includes an Internet-controlled pulsed relay 88. A rear actuator foot 53 of the actuator assembly 50a is attached to the upper surface of the base plate 37, and a front actuator foot 52 is attached to the upper surface of the delivery plate 36, so that the delivery plate 36 slides over the base plate 37 once the actuator 50 is activated.

Continuing with FIGS. 2 and 3, the pet treat dispensing apparatus 10 includes the treat dispensing unit 11 with its associated control circuit electronics portion 42, and preferably a video camera portion 12, which are positioned in the same area as the pet or pets. The control circuit electronics portion 42 and the video camera portion 12 are independently in communication with a local computer 17, which is also located where the pet or pets are located ("pet site"). The treat dispensing unit 11 and video camera portion 12 at the first, pet site, are controlled by the pet owner 25, who is at a second, remote site, using his or her Internet-accessible electronic device 20. In the system depicted in FIGS. 2 and 3, the remote Internet-accessible electronic device 20 is in communication with the local computer 17. In the event the pet owner 25 is in the vicinity of the local computer 17, the pet owner may operate the system using the local computer 17.

The pet treat dispensing apparatus 10 can be employed at the pets' and owner's home (domicile) as seen in FIG. 3, a pet day care center as seen in FIG. 2, or anywhere pets are housed. In addition to the owner's/pet's home, or a pet day care center, the pet care facility 14 may be a pet sitter's house, a veterinarian's office, grandma's house, or a veterinarian hospital, for example.

If the pets 13 are kept at home while the owner is gone, one or more treat dispensing units 11 are placed in the room where the pet(s) 13 are located (the pet site) as seen in FIG. 3, with one or more video camera portions 12 placed in the room out of the pets' reach. The video camera 26 may, for example, rest on top of the treat dispensing unit 11, or be hung on a wall or other vertical surface 76 in the room at the pet site, as illustrated in FIG. 3. Live feed from the video camera(s) 26 is transmitted back to the pet owner's smart phone 24 or other Internet-accessible electronic device 20 via the local computer 17. The local computer 17 is left on when the owner leaves for work, etc., but nobody has to be present to operate the local computer 17. Using the pet treat dispensing apparatus 10 and method of the present invention, the pet owner 25 can elect to watch the pet's activities on the screen of her or his Internet-accessible electronic device 20 wherever the owner is. The pet owner 25 commands the treat dispensing unit 11 using the Internet-accessible electronic device 20 she or he carries, such as the laptop computer 21 shown in FIG. 3, which communicates with the local computer 17 in the home via the Internet 18. The pet owner 25 need not be remote in order to activate the treat dispensing unit 11. If the pet owner 25 is present at the pet site, the pet owner can operate the pet treat dispensing apparatus 10 using the local computer 17, if desired.

Some owners crate their pet while they are at work. A treat dispensing unit 11 can be placed on top of a pet crate 61 so that the treat 35 falls through the wires of the crate 61, or otherwise into the crate 61, once it is dispensed by the pet owner 25 at his or her remote location (see FIG. 3).

The pet treat dispensing apparatus 10 and system 110 herein can be used no matter where the pet owner 25 is, so long as the pet owner has access to the Internet 18. The pet owner 25 may be staying at a relative's house, in a hotel room, traveling, in a cab or other car, or walking on the street. The pet owner can use a personal computer, laptop computer, a personal digital assistant, a smart phone or tablet pad, or any other Internet accessible electronic device 20 to watch his or her pet and/or dispense a treat for the pet.

The term "pet owner" as used herein is meant to be construed loosely as whomever is/are the main caregiver(s) for, or is responsible for, the pet, and is meant to include any appointees of the pet owner, as distinguished from a secondary caregiver such as an employee at a pet day care facility.

Continuing with FIG. 2, in addition to use at home, one or more pet treat dispensing apparatus 10 may be employed at a pet care facility 14, such as a doggie day care. A doggie day care facility with individual suites 15, or kennels, is shown in FIG. 2. Each suite 15 holds a treat dispensing unit 11 with its control circuit electronics portion 42 and video camera portion 12. The control circuit electronics portions 42 of the treat dispensing units 11 and the video camera portions 12 are in communication (preferably wireless) with a local computer 17/server and router on-site at the pet care facility 14. The local computer 17 connects with the Internet 18. The router may be wired or wireless. The local computer 17 is often kept in an office at the pet care facility. It can be operated by an operator 16, such as an employee at the pet care facility 14 (see FIG. 2). While they are away from their pets, each owner 25 of a pet 13 at the pet care facility 14 can communicate with the local computer 17 via the Internet 18 using their individual electronic devices 20. In this manner, the remote pet owner 25 can watch the pet using the video camera portion 12 and/or order the treat dispensing unit 11 in his or her pet's kennel 15, or suite, to dispense a pet treat 35.

As illustrated in FIG. 2, Internet-accessible electronic devices 20 suitable for use herein include a desktop personal computer 19, which may or may not belong to the pet owner, a laptop computer 21, a Web-enabled cellular telephone 22, a tablet pad 23, a smart phone 24, or the like. Those skilled in the art would appreciate that other computing systems may be used herein as well. The Internet-accessible electronic devices 20 may be coupled directly to the network, or via other networks, servers or routers. The Internet-accessible electronic devices 20 herein communicate over the network via currently available software and using network protocols.

By "Internet-accessible" is meant that the electronic device 20 or local computer 17 can be used to access the Internet 18 (directly or indirectly), preferably the global Internet via current protocols. The user can operate the pet treat dispensing apparatus 10, and employ the method of the present invention using the Internet-accessible electronic device 20 or local computer 17.

Currently, standard IP (Internet protocols) are used by electronic devices including computers to communicate over the Internet. This is in conjunction with the Domain Name System (DNS), which maps text names to IP addresses and permits use of the Uniform Resource Locator (URL) and the hypertext transfer protocol (http) to communicate, e.g., http://websitename.com. This may evolve over time to keep up with demand.

Referring to FIGS. 1 and 4-16, a preferred Internet-controlled treat dispensing unit 11 for dispensing a pet treat 35 comprises: (a) a treat rack assembly 34a comprising a treat rack 34 in an upper portion of the treat dispensing unit 11; (b) a slidable delivery plate 36 beneath the treat rack 34, the delivery plate 36 comprising a delivery plate cutout 40; (c) a stationary base plate 37 beneath the delivery plate 36, the base plate comprising a base plate cutout 41; (d) a guide rail assembly 72 on opposite longitudinal sides of the delivery plate 36; (e) an actuator assembly 50a comprising an actuator 50, a rear portion (rear actuator foot 53) of the actuator assembly 50a being attached to an upper surface of the base plate 37, and a front portion (front foot 52) of the actuator assembly being attached to an upper surface of the delivery plate 36; and (f) a control circuit electronics portion 42 comprising an Internet-controlled pulsed relay 88 in communication with the actuator 50 and with a local computer 17, the local computer 17 also being in communication with at least one remote Internet-accessible electronic device 20.

The treat dispensing unit 11 also preferably includes: (g) a chute 73 at a lower portion of the treat dispensing unit 11, the chute 73 comprising an upper chute opening 92 and a lower, front chute opening 85, the upper chute opening 92 being adjacent the base plate cutout 41; and (h) a lidded unit housing 75 enclosing the treat rack 34, the delivery plate 36, the base plate 37, the guide rail assembly 72, the actuator assembly 50a, the chute 73, and the electronics portion 42. The treat dispensing unit 11 comprises at least a dispensing position 43 and a parked position 44, a lower opening 39 of the treat rack 34 being adjacent the delivery plate cutout 40 when the treat dispensing unit 11 is in the parked position 44, the plate cutouts 40, 41 being substantially aligned with one another when the treat dispensing unit 11 is in the dispensing position 43, and not aligned when the treat dispensing unit 11 is in the parked position 44.

The first of these elements is the treat rack assembly 34a, which is at the top of the treat dispensing unit 11 under the unit housing 75. The treat rack 34 itself can be any shape that is suitable for holding the pet treats 35 to be distributed by the treat dispensing unit 11, although the treat dispensing unit 11 does not include compartments. The preferred treat rack 34 (as seen in FIGS. 4-8) is generally columnar in shape and substantially perpendicular to the generally horizontal delivery plate 36 beneath it. As seen in FIGS. 6-8, the treat rack 34 includes a rack slot 54 at the front of the rack to facilitate loading of the pet treats 35, for example, bone-shaped treats.

Figure 5:
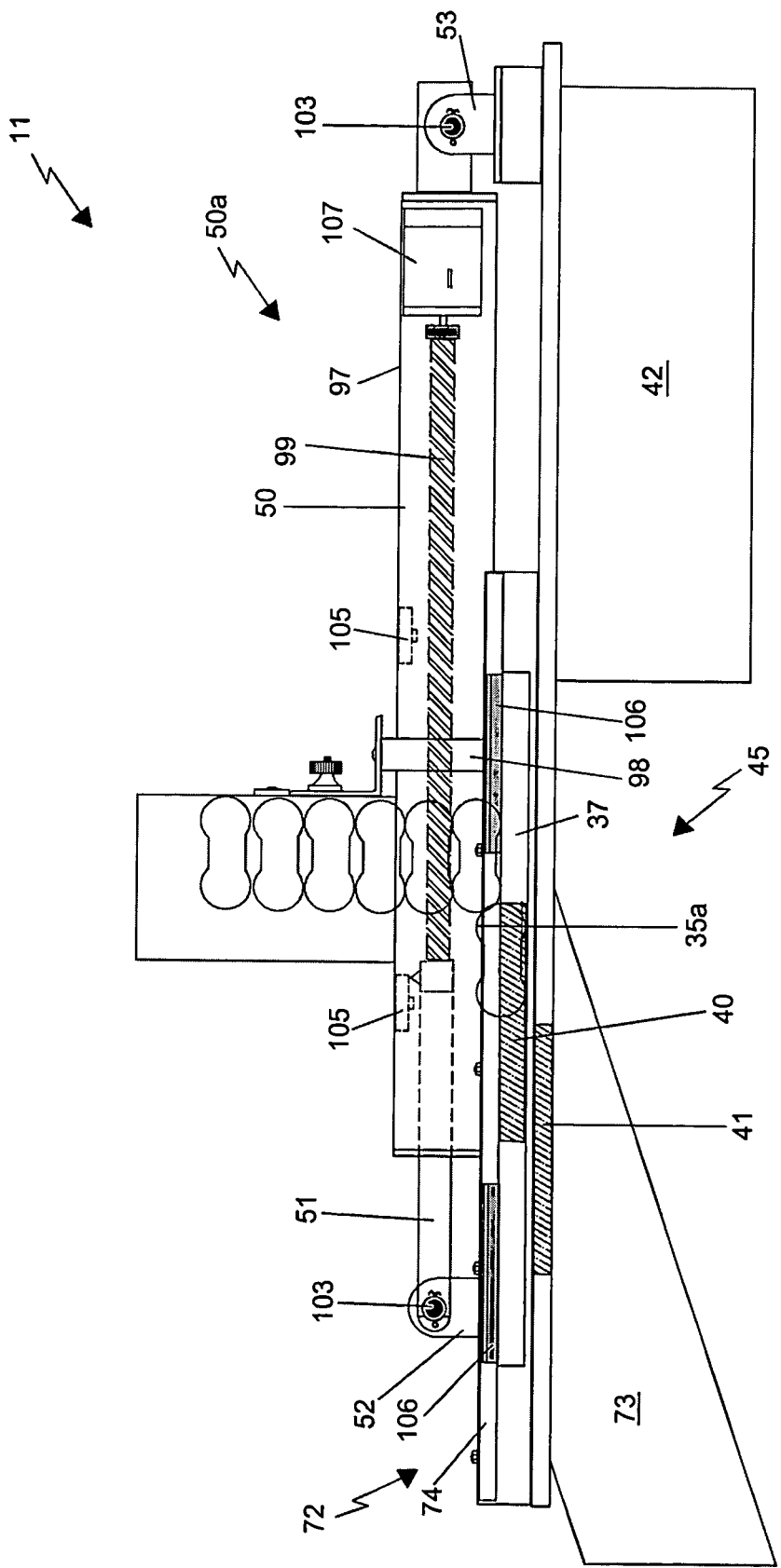
FIG. 5 is a side elevational side view of the treat dispensing unit of FIG. 4, shown in a half travel position.

In a preferred treat dispensing unit 11, the lower end of the treat rack 34 is open, as seen in FIGS. 5 and 8. When pet treats are loaded in the treat rack 34, the lowermost treat 35a falls through this lower rack opening 39 and lodges in the delivery plate cutout 40, where it is supported by the base plate 37 beneath it, as seen in FIG. 5. There, the lowermost treat 35a is contained by the rack cutout configuration and the edges of the delivery plate cutout 40. The treat rack 34 includes a notch cutout 109 on either side of the rack slot 54 at the base of the front of the treat rack 34, as seen in FIG. 10. The notch cutout 109 allows the lowermost treat 35a to come out of the treat rack 34, but prevents any other treats 35 above it from coming out of the rack prematurely. As the delivery plate 36 moves to the dispensing position 43 shown in FIG. 1, the lowermost treat 35a is carried along in the delivery plate cutout 40.

One or more pet treats 35 can be delivered at a time (one pass of the delivery plate over the base plate), depending on the size of the treat rack 34, the type of pet treats 35, and the size and shape of the plate cutouts 40, 41. The treat rack 34 is preferably refillable or replaceable. Treat racks of different sizes and/or shapes can be used to accommodate the various types of pet treats available in the marketplace. A smaller treat rack can be used to hold small treats for smaller pet breeds, and a larger treat rack can be used to hold larger bones or other treats for larger breeds of dog or other animals. The thickness of the delivery plate 36 can be changed for large or cylindrical shaped treats, as well as the plate cutouts 40, 41. The treat rack 34 on a pet treat dispensing apparatus 10 can be refilled or changed out when a dog of a different size or with different needs (e.g., young or older dog, arthritic dog) is expected in the kennel, for example. It is recommended that pets be supervised while eating.

As best seen in FIGS. 6-8 and 9-11, the vertical rear wall 55 of the treat rack 34 includes a hole through which a screw 79 passes. The screw stem also passes through the spacer 83, if one is used. Alternatively, a screw stud 78 can be spot welded to the rear wall 55 of the rack 34. The screw stud 78 of the screw 79 also extends through one (vertical) leg of an L-shaped bracket 67 adjacent the outside rear wall 55 of the rack 34. The other, lower leg of the L-shaped bracket 67 is bolted to the top of the guide rail assembly 72 via two hollow standoffs 98 with bolts so as to hold the treat rack 34 in place (see FIGS. 4 and 5). A thumbscrew nut 66 on the screw stud 78 at the rear of the L-shaped bracket 67 permits attachment of the treat rack 34.

Figure 12:
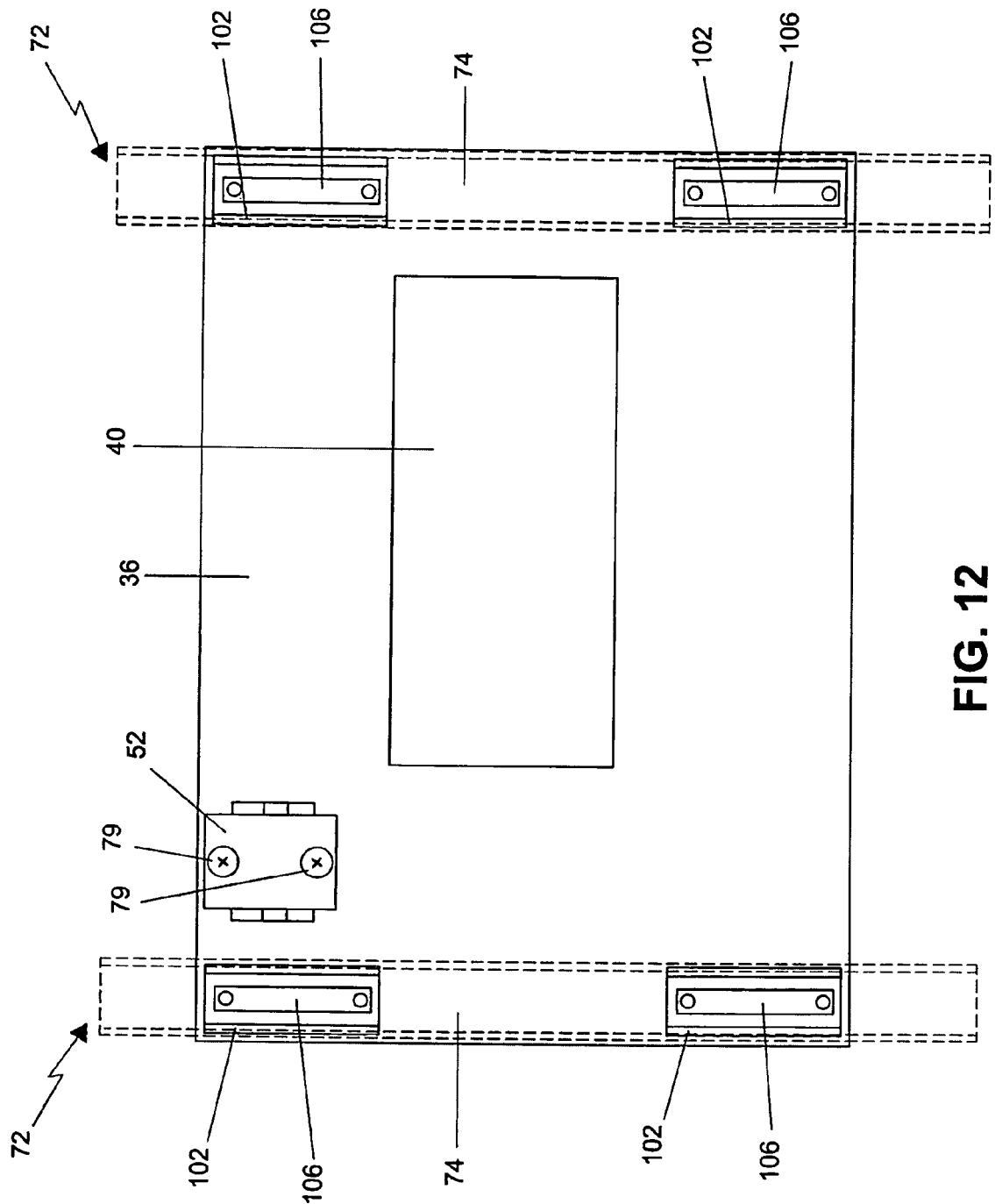
FIG. 12 is a top plan view of a delivery plate and guide rail assembly of the treat dispensing unit of FIG. 5.

A second element of the preferred treat dispensing unit 11 is the delivery plate 36, which lies in a horizontal plane under the substantially vertical treat rack 34, as seen in FIGS. 1 and 4. As seen in FIG. 12, the substantially planar delivery plate 36 is preferably rectangular or square in shape, with guide rails 74 and a guide rail block 106 of the guide rail assembly 72 seen on its opposite longitudinal sides.

Figure 13:
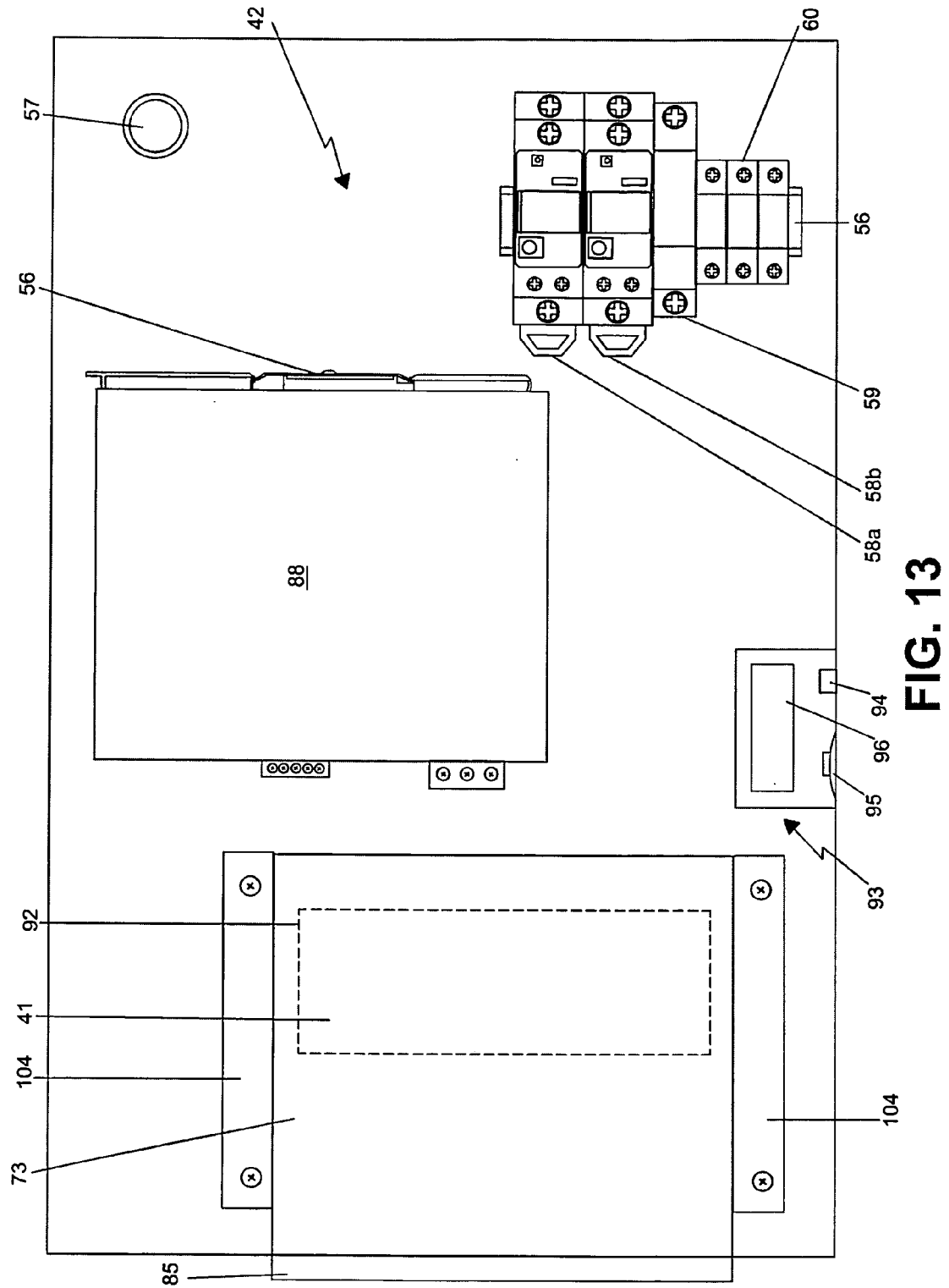
FIG. 13 is a bottom plan view of an exemplary embodiment of a treat dispensing unit according to the present invention.

As seen in FIGS. 1 and 4, a third element of the preferred treat dispensing unit 11 is the base plate 37, a substantial portion of which lies beneath and parallel to the delivery plate 36, with a gap between the delivery plate and the base plate. As seen in FIG. 13, the substantially planar delivery plate 36 is preferably rectangular or square in shape. The base plate 37 is slightly wider than the delivery plate 36, and is about twice the length of the delivery plate 36.

As seen in FIGS. 12 and 13, the delivery plate 36 and the base plate 37 each include a cutout 40, 41. The size of the plate cutouts 40, 41 is based on the largest size treat that will be dispensed. A preferred rectangular cutout size is between about one and two inches wide and between about two and three inches in length for conventional treats. This generally corresponds to the size of the lower opening 39 of the treat rack 34, and to the size of the upper chute opening 92. The position of the rack lower opening 39 above the delivery plate cutout 40 and base plate 37 is sized so that it allows only one treat to move out of the treat rack 34 at a time. The plate cutouts 40, 41 can be sized to fit a wide range of treat sizes. As seen in FIG. 12, the delivery plate cutout 40 is located in a central area of the delivery plate 36, except that it is skewed to one side so that it is not below the actuator 50, which extends over the delivery plate. The base plate cutout 41 is located in a front area of the base plate 37 toward the middle of the base plate.

Returning to FIG. 6, a spacer 83 on the outside rear wall 55 of the treat rack 34 helps to keep the treat rack 34 located to the front of the delivery plate cutout 40 while the delivery plate 36 is in the parked position 44. In this position, the treat rack 34 and delivery plate cutout 40 hold the lowermost treat 35a in place. The rack assembly 34a also includes a positioning stop 84 adjacent the rack rear wall spacer 83 aligns the treat rack 34 just above the delivery plate 36 and prevents it from rotating side to side. The thumbscrew nut 66 and the L-shaped bracket 67 at the rear wall of the treat rack 34 (see FIGS. 4 and 5) help to position the treat rack 34 over the delivery plate cutout 40. The length, width, depth and distance from the delivery plate are determined by actual treat dimensions. The treat rack 34 is made (or adjusts) to accommodate that treat size. Thus, a treat rack assembly 34a preferably includes: the treat rack 34 itself, one or more spacers 83 and a positioning stop 84, one or more thumbscrew nuts 66, and an L-shaped bracket 67.

As seen in FIGS. 9-11, a removable rack insert 81 can optionally be placed in the treat rack 34 for reducing space in the treat rack for holding smaller treats. The rack insert 81 has substantially the same shape as the treat rack 34, except that the rack insert 81 is smaller so that it fits closely down into the treat rack 34. The rack insert 81 does not form separate compartments; only the central area within the rack insert is filled with the treats. The rack insert 81 also includes a notch cutout 109 on either side of the rack insert slot 54 at the base of the front of the rack insert 81 for allowing only the lowermost treat 35a to pass. As illustrated in FIGS. 9-11, a second, uppermost screw stud 78 of a second screw 79, with a thumbscrew nut 66 on it, preferably extends through a second, upper hole in the rear wall 55 of the rack insert 81 in order to hold the rack insert 81 in the treat rack 34. A rack rear wall spacer 83 on the outside rear wall 55 helps to keep the rack insert 81 located to the front of the delivery plate cutout 40 while the delivery plate 36 is in the parked position 44. The positioning stop 84 on the outside rear of the treat rack 34 helps to keep the treat rack 34 in alignment. A rack side wall spacer 80 on each opposite side wall of the treat rack 34 helps to prevent the rack insert from wobbling in the treat rack 34.

As best seen in FIGS. 1, 4, 12, 14, and 15, the fourth component is the guide rail assembly 72, which preferably has two portions. Each portion of the guide rail assembly 72 includes one guide rail 74, a base 101, and a top connecting plate 108. The guide rail 74 and the base 101 of the guide rail assembly 72 are connected together by the top connecting plate 108. Continuing with FIGS. 14 and 15, the base 101 of each of the two portions of the guide rail assembly 72 is attached to the upper surface of the base plate 37. Each portion of the guide rail assembly 72 extends over a longitudinal edge of the delivery plate 36. The two guide rails are preferably substantially parallel to one another. The bases of the guide rail blocks 106 are attached to the upper surface of the delivery plate 36 along the longitudinal sides of the delivery plate. The upper shoulders 102 of each guide rail block 106 fit into, and are slideable along, a slot 100 in the guide rail 74. The guide rail 74 is suspended over a side edge of the delivery plate with the slot 100 facing down. In this manner, the delivery plate 36 is slidable along the guide rail assembly 72.

In regard to the fifth component of the treat dispensing unit 11, the preferred plate drive mechanism 38 is an actuator 50 of an actuator assembly 50a. The plates 36, 37 can alternatively be belt driven or gear driven. A preferred actuator assembly 50a includes a screw-type actuator 50 within a protective actuator housing 97 as best seen in FIGS. 1, 4, and 5. A rear foot 53 of the actuator assembly 50a is attached to the stationary base plate 37 adjacent the rear edge of the base plate 37. A front foot 52 of the actuator assembly 50a is attached to the front of the delivery plate 36 adjacent the front edge of the delivery plate. Only the actuator feet 52, 53, and not the actuator 50 itself, are attached. The generally horizontal actuator 50 and its housing 97 extend across but do not contact either of the generally horizontal plates 36, 37. The bases of the actuator feet 52, 53 are preferably attached to the plate 36 or 37 by screws 79 (see FIG. 12). The ends of the actuator housing 97 and the front actuator rod 51 are preferably connected at about right angles to the tops of the rear and front actuator feet 52, 53, respectively, via pins 103 in the actuator feet 52, 53, preferably pivot pins with Cotter pins at the ends of the pivot pins. The front actuator rod 51 rides on the front end of the actuator shaft 99 and extends through the front of the actuator housing 97, as seen in FIG. 5. The actuator shaft 99 is driven by a screw drive motor 107 that is also enclosed by the actuator housing 97. Thus, a preferred actuator assembly 50a includes a screw-type actuator 50 with a screw drive shaft 99, a screw drive motor 107, a generally box-shaped actuator housing 97, the front actuator rod 51, and the actuator feet 52, 53 on opposite ends of the actuator assembly 50a.

In regard to the sixth component of the treat dispensing unit 11, the control circuit electronics portion 42 preferably includes an Internet-controlled pulsed relay 88 and other components that allow proper functioning of the treat dispensing unit. In the treat dispensing unit 11 shown in FIGS. 1, 4, 5, and 13, the control circuit electronics portion 42 is beneath the base plate in the rear area, adjacent the chute 73, which is in the front area at the bottom of the base plate. The Internet-controlled pulsed relay 88 in its protective box is preferably removably attached to a mounting bracket 56. One end of the relay mounting bracket 56 is attached to the lower surface of the base plate 37 behind the chute 73, as seen in FIGS. 1 and 13. The control circuit electronics portion 42 activates the actuator 50, so that it turns the screw drive shaft 99 within the protective actuator housing 97. The forward and reverse movement of the actuator rod 51 is limited by preset limit switches 105. Therefore, the range and distance of travel is optimally set and prevents overdraft of the delivery plate 36.

Along with the Internet-controlled pulse relay 88, the control circuit electronics portion 42 also includes a section that includes a fuse holder 59, relays K1, K2 58, and wire terminal blocks 60 (see FIG. 13). This second section is also mounted to the lower surface of the base plate 37, preferably via a mounting bracket 56. As is also seen in FIG. 13, the base plate 37 also includes a wire feed hole 57 with a grommet to protect wires from coming in contact with sharp edges of the base plate 37. These wires are for connecting the control circuit electronic portion 42 to the actuator 50, the proximity sensor 69 or lever operated switch 70, the manual load switch 77, etc.

When the actuator 50 is activated via the control circuit electronics portion 42, its screw action pushes the front actuator rod 51 and the front actuator foot 52 forward, which moves the delivery plate 36 forward over the base plate 37. Alternatively, reversed rotation of the actuator 50 pulls the front actuator rod 51 in, and the front actuator foot 52 back, which pulls the delivery plate 36 over the base plate 37. The rear actuator foot 53 is stationary. In this manner, the delivery plate 36 is pushed forward or pulled back, guided by the guide rail assembly 72. The position midway between the parked position 44 and the dispensing position 43 is called here "half-travel position" 45. The plate cutouts 40, 41 are not aligned with one another when the treat dispensing unit 11 is in half-travel position 45, nor in parked position 44, so treats are not dispensed in those two positions.

The delivery plate cutout 40, which is preferably located at about the center of the delivery plate 36, is preferably smaller than or equal to the base plate cutout 41 in size. When the front rod 51 of the actuator 50 is pushed out to its full extent, the plate cutouts 40, 41 overlay one another and the treat dispensing unit 11 is in the dispensing position 43. After being moved forward from the treat rack 34, the lowermost treat 35a drops by gravity through the upper chute opening 92 into the chute 73. The lowermost treat 35a then slides down the angled chute 73 and out the front chute opening 85, ordinarily to the floor, where it can be retrieved by the pet.

The seventh component, the treat chute 73, is found at the bottom of the preferred treat dispensing unit 11. Treats 35 pass through the treat chute 73 as they exit the treat dispensing unit 11. The chute 73 receives the lowermost treat 35a once it drops through the base plate cutout 41 when the treat dispensing unit 11 is in the dispersing position 43. The chute 73 is preferably angled as seen in FIG. 1 to allow the treat 35a to easily slide down the chute 73 by its own weight once it is dropped through the base plate cutout 41. The chute 73 and the control circuit electronics portion 42 are below the stationary base plate 37, as seen in FIGS. 1, 4, and 5.

The treat chute 73 is open at its opposite ends. The upper chute opening 92 is slightly larger than and surrounds the adjacent base plate cutout 41. As seen in FIG. 13, the treat chute 73 is attached to the lower surface of the base plate 37 by chute "L" flanges 104 on opposite sides of the chute 73. The treat chute 73 is of such a dimension and is positioned so that the pet treats drop out in a convenient place for the pet to access them. Preferably the chute 73 is angled beneath the treat dispensing unit 11 with the front chute opening 85 just below and slightly in front of the base plate 37. In FIG. 1, the same treat is shown (3X) sliding down the chute 73 for purposes of illustration.

The pet treat can be any type of treat that will reasonably fit in a treat rack 34 and can drop through a chute 73. It can be made of rawhide, dried meat or vegetables, cow hooves, or any materials commonly used to make pet treats that can be stored in and distributed from the treat rack 34. It can be in the shape of a bone, a stick, or a cylinder, for example. The pet treats 35 each have substantially flat upper and lower surfaces so that they can easily be stacked on top of one another.

Figure 16:
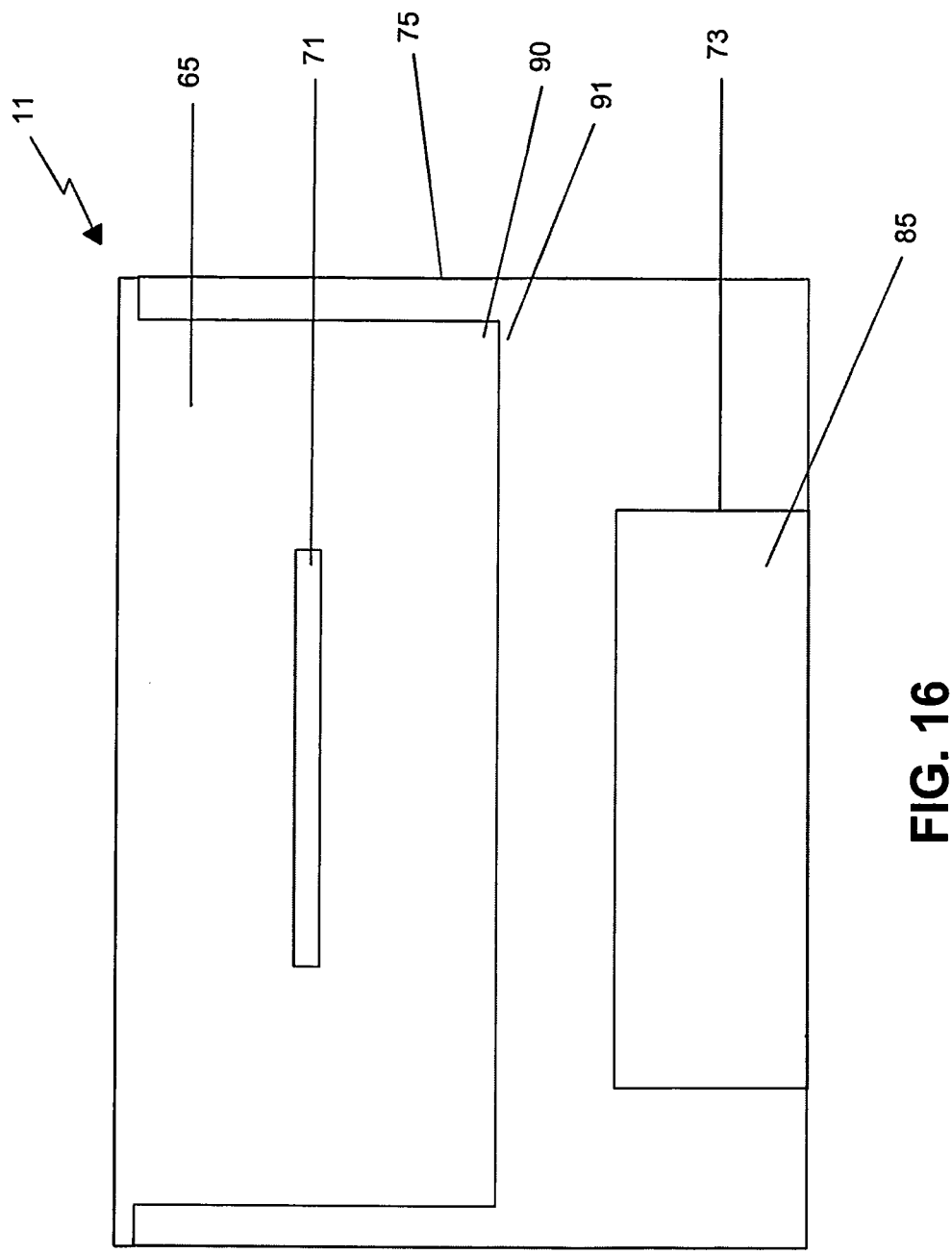
FIG. 16 is a front elevational view of an exemplary embodiment of a treat dispensing unit according to the present invention.

As seen in FIGS. 1 and 16, the treat dispensing unit 11 is preferably enclosed by a unit housing 75 around it for cleanliness, appearance, and safety. (FIGS. 4 and 5 are shown without a unit housing for purposes of illustration.) The unit housing 75 preferably has a hinged lid 65 at the top. The lid 65 may be L-shaped in cross-section, as seen in FIG. 1, or it may be a simple flat lid that extends across the top of the unit housing 75. At one end of the lid 65 is the hinge 63 (see FIG. 1), which connects the lid to the rest (stationary portion) of the housing 75. The opposite, front end 90 of the housing lid 65 drops into place onto a correspondingly shaped front end 91 of the unit housing 75 as seen in FIGS. 1 and 16. A horizontal handle 71 across the front of the housing lid 65 facilitates lifting the housing lid (see FIG. 16). A door stay 64 is included on the lid 65 to keep the housing lid 65 open or closed.

The treat dispensing apparatus 10 optionally includes a hardware or software timing mechanism for delaying distribution of the pet treat until later. The delay timing mechanism is on the local computer 17 or within the control circuit electronics 42 on the treat dispensing unit 11. If the pet owner anticipates being busy at lunchtime, for example, but wishes the pet to have a treat at noon, the pet owner 25 activates the timing mechanism so that a treat 35 is automatically released from the rack 34 at noon. The timing mechanism can also be used if, for example, the pet owner wishes to delay delivery of the treat for an hour or two because the pet just had a meal. The amount of delay, or time the treat is to be dispensed, is entered on the control block 27, which is accessed using the Internet-accessible electronic device 20, or it can be accessed using the local computer 17. The user interfaces using the control block 27.

Figure 20:
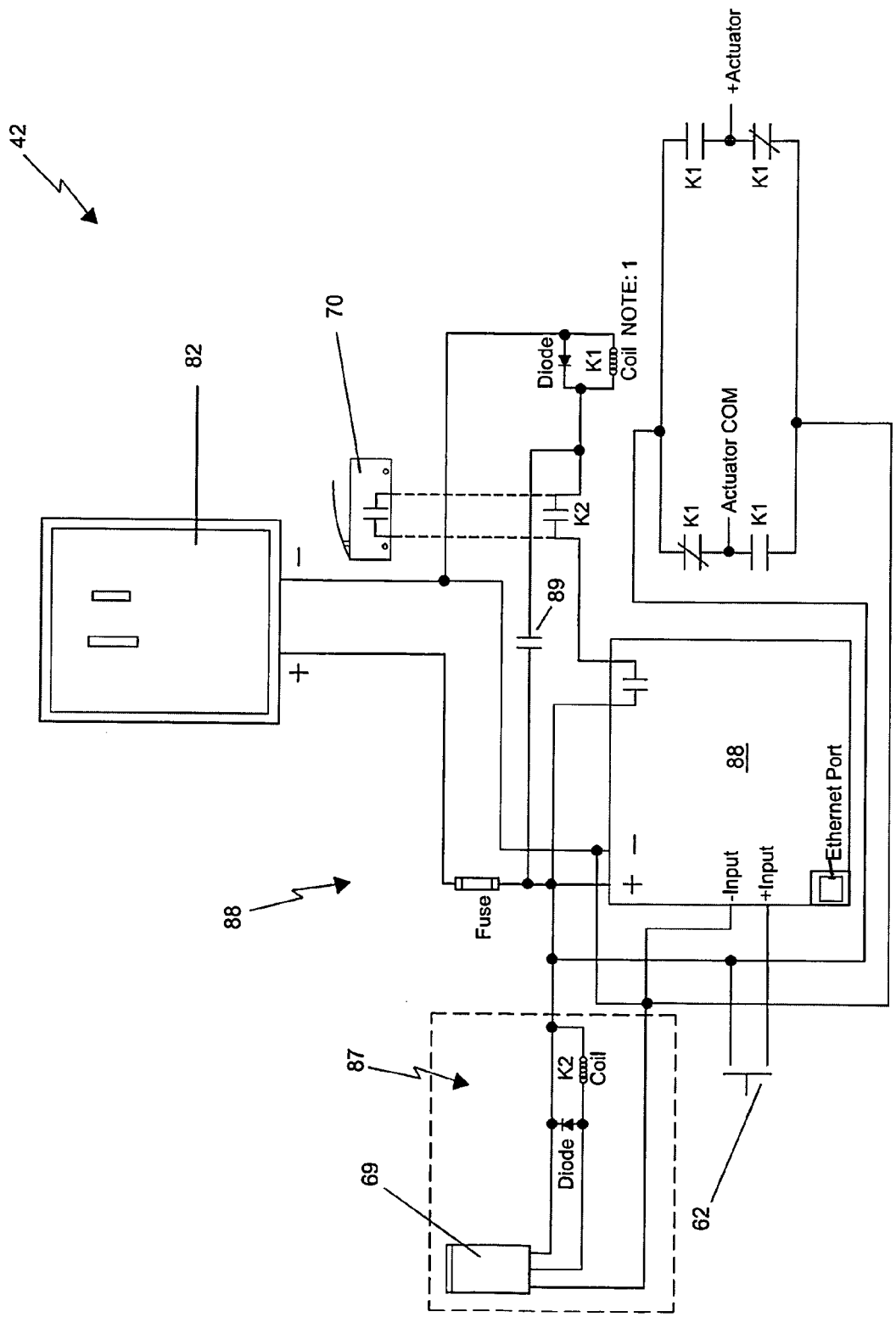
FIG. 20 shows an exemplary embodiment of a control circuit of an exemplary embodiment of an Internet-accessible pet treat dispensing apparatus according to the present invention.

As seen in FIGS. 1 and 20, a push button switch 62 on the unit housing is an option. The pet owner, if he or she is there with the pet, or someone else on site, like a kennel worker or veterinarian's assistant, can trigger the treat dispensing unit 11, if the pet owner wishes. The treat dispensing unit 11 shown in FIG. 1 includes a button 62a of the push button switch 62 for activating the treat dispensing unit 11 by hand. The push button switch 62 is locked out by the proximity sensor 69, or optionally by the lever operated switch 70, when the housing lid 65 is open, so no treat can be dispensed when the housing lid 65 is open. The proximity sensor 69 has a ferrous metal plate 68 at the top, attached to the lower surface of the housing lid 65 (see FIG. 1). When the housing lid 65 is lifted, the metal plate 68 is pulled away from the proximity sensor 69. All functions, including remote control, except manual load are locked out when the housing lid 65 is open.

The treat dispensing apparatus 10 is believed to be safe for the pets, and for any people in the area, but it is a good idea for a person to be in the area while pets are eating in case of choking, disputes, or other problems, particularly young or old pets or breeds prone to choke or have food-related problems.

The treat dispensing apparatus 10 optionally includes an audio portion 93 for one-way or two-way communication between the pet owner 25 and the pet. The audio portion 93 can be run off the local computer's speakers, or through internal speakers 112 and a microphone in the video camera portion 12 or at the treat dispensing unit 11 as seen in FIG. 13. As seen in FIG. 13, an audio portion 93 attached to the treat dispensing unit 11 has a microphone 94 that picks up sounds at the pet site, like a dog bark, or for recording a message to be played as the pet treat 35 is dispensed, and/or a speaker 95 that permits the dog/pet to hear the pet owner 25, who speaks into a remote electronic device 20, or listen to the pre-recorded message. Alternatively, a recording device 96 in the audio portion 93 (e.g., OEM [original equipment manufacture] digital voice recorder module) plays a pre-recorded message at the pet site, such as "Good Dog, Good Dog!", most preferably at the same time the pet treat is released so that the dog associates the treat with the owner's voice. The audio portion 93 may alternatively include an internal or external speaker and/or a video display on the video camera portion 12 for the owner to talk to the pet. This provides additional positive reinforcement for the dog or other pet, as well as the pet owner when he or she sees the pet respond affirmatively to the message (by wagging its tail, for example). To talk to the pet, the pet owner's remote Internet-accessible electronic device 20 and its software allow for transmission of audio or voice.

The pet treat dispensing apparatus 10 may be used to dispense treats for more than one pet, if desired. The treat dispensing unit 11 can be placed in the room or kennel where a single pet is located for the purpose of distributing treats to that pet. The pet owner 25 can provide a treat 35 for his or her pet 13 from the office or other workplace, a restaurant, a gym, a car, a bus, a train, the airport, or even on the street, so long as the pet owner can access the Internet 18 from his or her remote location.

The treat dispensing unit 11 is connected to the local computer 17, which has software that communicates with the treat dispensing unit 11 and makes the treat dispensing unit 11 available to the remote user (owner) using the Internet 18. The treat dispensing unit 11 preferably comes with a software installation disk. The control block 27 and camera view are combined into one page for the home user to view using any Web browser. This page, which is located on the local computer 17, is accessed remotely. Alternatively, the treat dispensing unit 11 can be accessed without the local computer 17 with static IPs from the Internet service provider (ISP) for the video camera portion 12 and the treat dispensing unit 11. Webpages are located on the electronic device 20 or a web hosting site.

Figure 18:
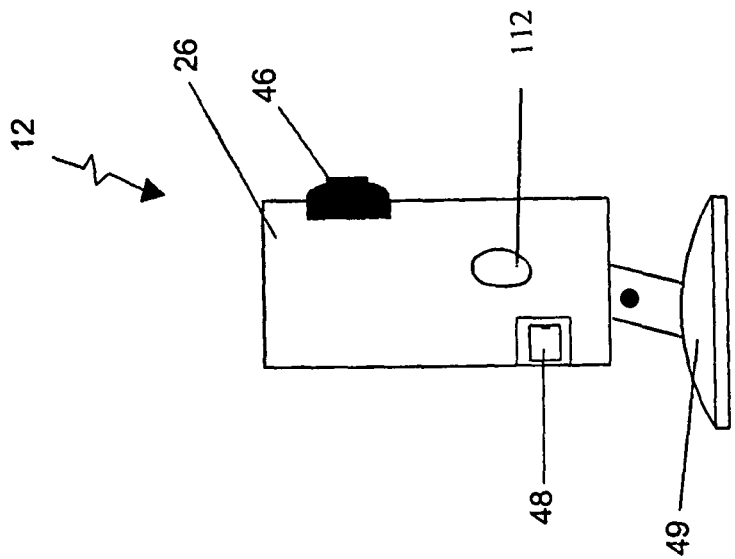
FIGS. 17 and 18 are each side elevational side views of exemplary embodiments of a video camera portion of an Internet-accessible pet treat dispensing apparatus according to the present invention.
Figure 17:
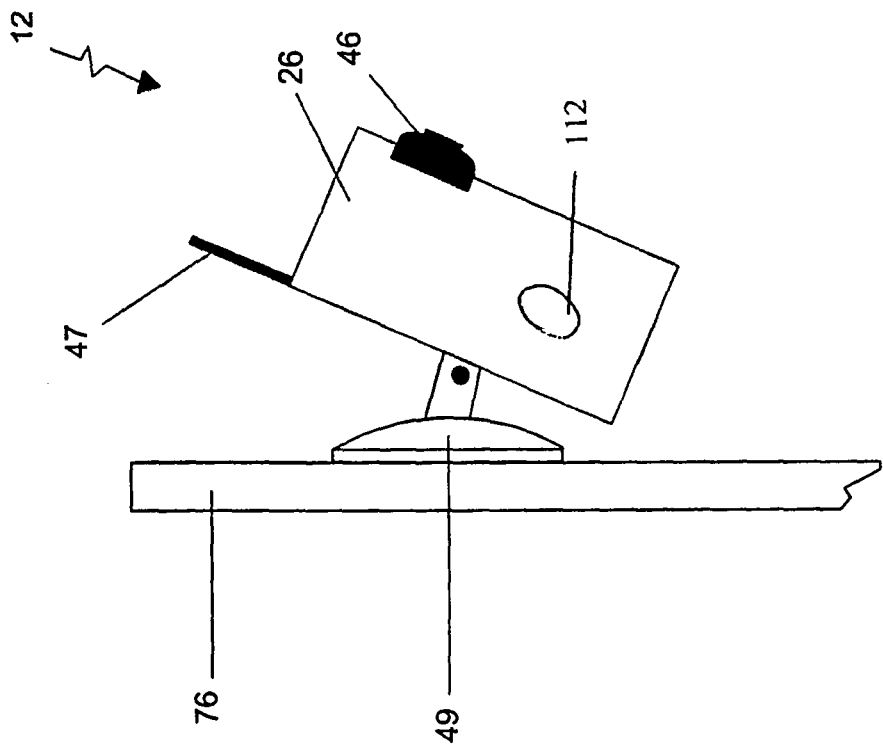

As seen in FIG. 17, the video camera portion 12 is preferably attached to a wall or other vertical surface 26 of the kennel 15 or home above a level that most dogs/pets cannot reach. The camera lens 46 of the video camera 26 of the video camera portion 12 is tilted down so as to capture most or all of the kennel or home floor area, thus affording the pet owner 25 a good view of his or her pet 13 at the pet site. The video camera portion 12 includes at least one video camera 26, with wireless capability as seen in FIG. 17 (see antenna 47), or an Ethernet port cable 48 as shown in FIG. 18, that is attached to the local router and local computer, or directly to the local computer, depending on the application and number of video cameras 26 and treat dispensing units 11 employed. The video camera portion 12 can alternatively rest on a camera portion stand 49 on a suitable elevated flat surface as seen in FIG. 18.

Where the pet is sick, infirm (e.g., an old dog), or very young (e.g., a puppy or kitten), the video camera portion 12 assumes greater importance, since the owner will probably want to check in on the dog more frequently to see how he or she is doing, particularly if the pet had surgery or is at a veterinarian's office/hospital. The pet is preferably a mammal, most preferably a dog or cat, although it could be a pet goat, pig, horse, llama, ostrich, guinea pig, parrot, or any other domesticated animal that can receive a pet treat.

FIG. 20 depicts a control circuit electronics portion 42. The treat dispensing unit 11 preferably includes a plug-in AC transformer 82 that is plugged into a standard AC outlet. As seen in FIG. 20, K1 is a DPDT relay 58a used to change the direction of the actuator 50 automatically during operation of the dispensing apparatus 10. K2 in FIG. 20 is a relay 58b used to disable remote operation if the lid 65 to the unit housing 75 is opened and using the proximity circuit 87. The K2 relay 58b is "On" when the housing lid 65 is closed. Optionally, K2 and the proximity circuit 87 can be replaced with a lever operated switch 70 (FIG. 20). The Internet-controlled pulsed relay 88 closes its contact when the user requests that a pet treat 35 be dispensed. After a pre-programmed amount of time, the contact automatically opens and the actuator 50 returns to the parked position 44.

Continuing with FIGS. 14 and 20, the auto-manual load switch 77 is used to put the delivery plate 36 in the dispensing position 43. This enables the user to more easily fill the treat rack 34 with treats 35 if the treat rack 34 is empty. The manual load switch 77 is not intended for use while any pet treats remain in the treat rack 34. If the manual load switch 77 is used with the pet treats 35 already loaded, one treat will be delivered. The contact 89 of the manual load switch 77 feeds directly to the K1 relay 58a, bypassing the Internet-controlled pulsed relay 88.

The Internet-controlled pulsed relay 88 is preferably connected to the Internet 18 through any means typically provided to users of the global Internet. Relay K2 58b is activated by the proximity sensor 69 or optional lever operated switch 70 to detect when the housing lid 65 is closed. If the housing lid 65 is closed, the treat dispensing unit 11 will operate from a remote command, or optionally via the manual push button switch 62. If the housing lid 65 is open, the treat dispensing unit 11 will not operate except via use of the manual load switch 77 if necessary.

A fuse in-line with the wall-mounted AC adapter protects the electronics from a direct short or extreme overcurrent. Fuse holder 59 can be mounted within the unit housing 75 as shown on FIG. 11, or externally mounted on the unit housing 75 for easy access when the fuse is being replaced.

As an alternative to being hardwired to the local computer 17, the treat dispensing unit 11 may be wireless. In this case, a wireless device (e.g., bridge or Wi-Fi gateway) is attached to the Internet-controlled pulsed relay 88, Ethernet port providing a wireless connection.

As depicted in FIGS. 2 and 3, the Internet-accessible pet treat dispensing system 110 herein comprises at least two pet treat dispensing apparatus 10, the dispensing system comprising: (a) at least two treat dispensing units 11 operating independently of one another, one for each pet treat dispensing apparatus 10, each treat dispensing unit 11 comprising a treat rack 34 for storing a plurality of pet treats 35, a delivery plate 36, a base plate 37, and a mechanism 38 for sliding the delivery plate over the base plate 37, a lower opening of the treat rack 34 being positioned over a delivery plate cutout 40 in the delivery plate 36, the base plate 37 comprising a base plate cutout 41, each of the treat dispensing units 11 comprising at least a dispensing position 43 wherein the plate cutouts 40, 41 are aligned, and a parked position 44 wherein the plate cutouts 40, 41 are not aligned; (b) a control circuit electronics portion 42 attached to each of the treat dispensing units 11, each of the control circuit electronics portions 42 comprising an Internet-controlled relay 88 connected to the delivery plate sliding mechanism 38 of a treat dispensing unit 11; (c) an Internet-accessible local computer 17 in communication with the control circuit electronics portions 42, and with at least one remote Internet-accessible electronic device 20; and (d) a video camera portion 12, which can be in communication with the local computer 17 or with the control circuit electronic device 42 of the treat dispensing unit 11.

Where the Internet relay 88 has a built-in web server, the treat dispensing system 110 herein does not require a local computer 17 connected externally or internally to the treat dispensing unit 11. The built-in web server here does not require any special OS operating system or custom software to be installed in order to operate and is capable of communicating directly with the Internet 18. The local computer 17 only acts as an Internet interface and local user display. The local computer running Dynamic DNS (Domain Name System) software, which can be obtained from a service that provides it, allows the treat dispensing unit 11 to be made available to the Internet 18 without the use of a static IP. Therefore, the local computer 17 in this case does not provide direct control over the treat dispensing unit 11.

For the multiple treat dispensing unit day care facility, the local computer 17 can be a full web server, not simply a personal computer. The local computer/Web server performs all web hosting functions, including webpage hosting and the user database, including billing and system management. There is no need for a web portal or external web hosting or off-site web hosting services. The user/owner connects directly to this web server. Thus, the dispensing system 110 herein includes: 1) multiple Internet connectable electronic devices 20, which connect to 2) the Internet 18, via 3) the local computer/web server, to 4) the multiple treat dispensing units 11 and 5) the multiple video camera portions 12.

Figure 22:
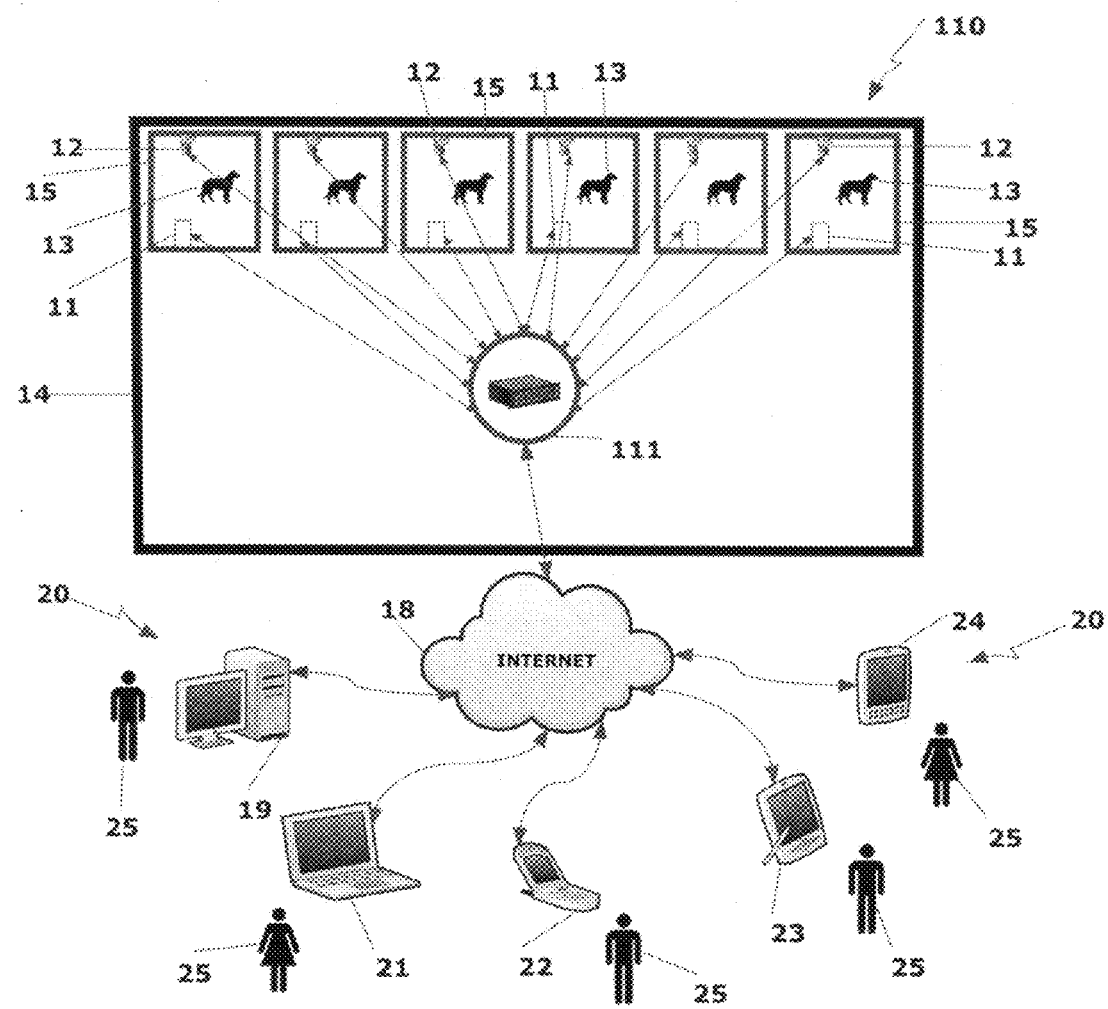
FIG. 22 is a schematic diagram of an exemplary embodiment of an Internet-accessible pet treat dispensing system according to the present invention, shown at a pet care facility.

Turning to FIG. 22, an alternate dispensing system 110a and apparatus 10 herein includes a router with a built-in DDNS (Dynamic Domain Name System) client 111. The router is also in communication with the DDNS service. This DDNS client capable router ("DDNS router") 111 is connected to the treat dispensing unit 11 and the video camera portion 12. Using this DDNS router 111, the control circuit electronics portion 42 of the treat dispensing unit 11 can be connected to the Internet 18 anytime and anywhere without a computer connected. The local computer acts only as a display here and is not required to operate the treat dispensing unit 11 or the video camera portion 12. The DDNS router 111, the treat dispensing unit 11 with its electronics portion 42 can be transported to any location, along with the video camera portion(s) 12. The pet treat dispensing apparatus 10, then, is truly portable.

For the multiple treat dispensing unit day care facility, the DDNS router 111 in this case replaces the local computer 17. The DDNS router 111 has access to cable, DSL (Digital Subscriber Line) modem or other available devices for Internet connection. Thus, the dispensing system 110a includes: 1) multiple Internet connectable electronic devices 20, which connect to 2) the Internet 18, to 3) the DDNS router 111, to 4) the multiple treat dispensing units 11, and 5) the multiple video camera portions 12, as seen in FIG. 22.

Whether it is on the local computer 17 or the router 111, the DDNS client is in communication with a DDNS service, which allows communication with the treat dispensing unit 11 and the video camera portion 12, regardless what IP address is assigned to the router or local computer by the local Internet Service Provider (ISP). The pet treat dispensing apparatus 10 is therefore portable.

In a first scenario involving a local computer 17, the present system 110 progresses as follows: 1) Internet-accessible electronic device 20; 2) Internet 18; 3) web hosting offsite for webpage(s); 4) DDNS service or the like; 5) local computer 17 with DDNS client software; 6) non-DDNS router; and 7) one or more treat dispensing units 11 and 8) one or more video camera portions 12.

In a second scenario without a local computer, the system progresses as follows: 1) electronic device 20; 2) Internet 18; 3) web hosting offsite for webpage(s); 4) DDNS service or the like; 5) router with DDNS client 111; 6) one or more treat dispensing units 11 and 7) one or more video camera portions 12. Since it does not involve a local computer, this treat dispensing apparatus 10 is more easily transported.

Figure 21:
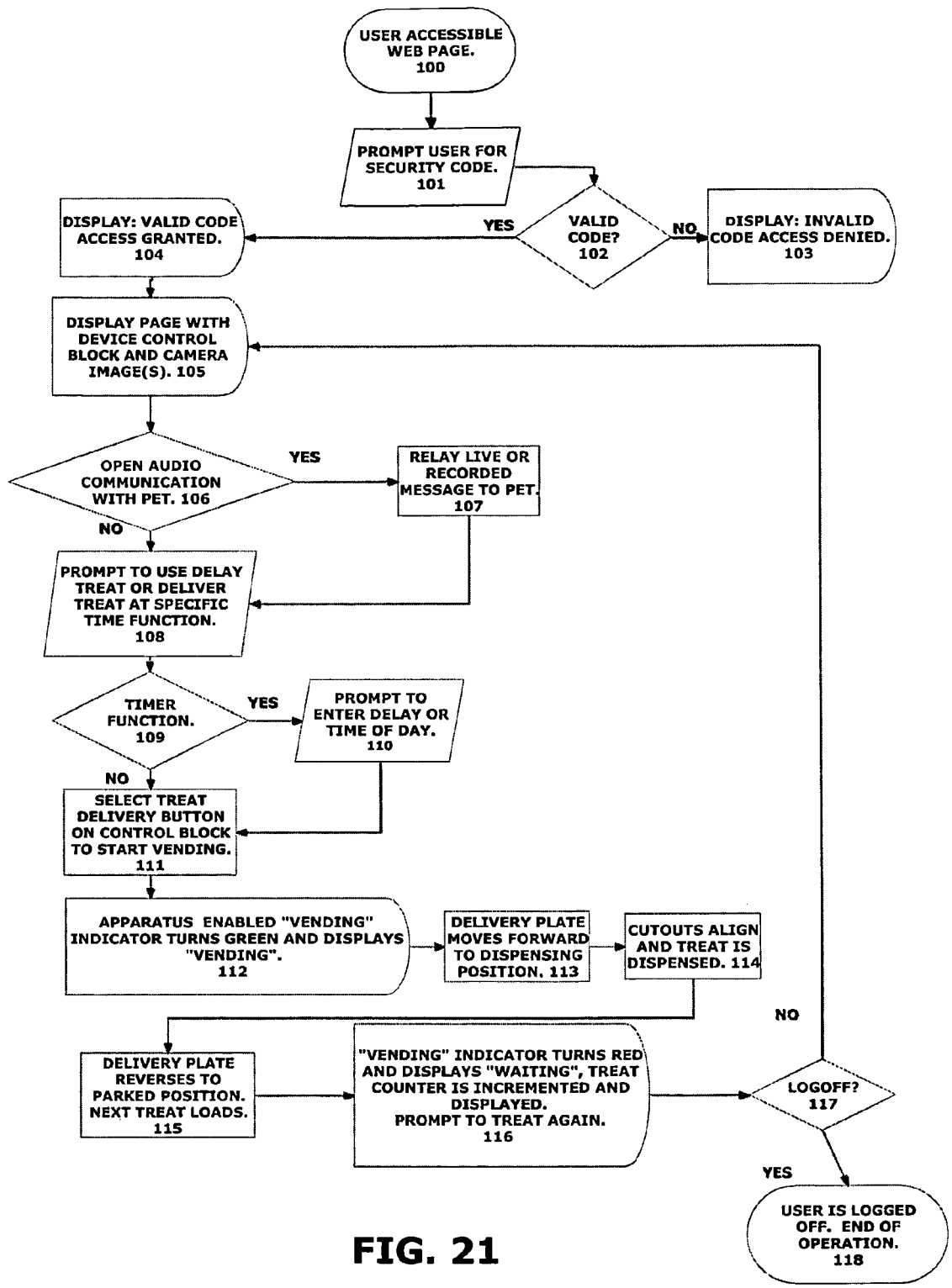
FIG. 21 is a flowchart depicting an exemplary embodiment of an Internet-accessible pet treat dispensing business method consistent with the present invention.

Turning to the FIG. 21 flowchart, the present invention includes a method for remotely dispensing a pet treat using an Internet-accessible pet treat dispensing apparatus 10 as described herein. This treat dispersing method includes the following basic steps: (1) providing at a pet site an Internet-accessible pet dispensing apparatus 10 comprising: (a) a treat dispensing unit 11 comprising a slidable delivery plate 36, a stationary base plate 37 below the delivery plate 36, and a mechanism 38 for sliding the delivery plate 36 over the base plate 37; (b) a control circuit electronics portion 42 attached to the treat dispensing unit 11, the control circuit electronics portion 42 being in communication with the mechanism 38 for sliding the delivery plate and with a router 111 or local computer 17 at the pet site, the router or local computer 17 being in communication with at least one remote Internet-accessible electronic device 20; and (c) at least one video camera portion 12 in communication with the local computer 17 or the control circuit electronics portion 42; (2) providing a user-accessible webpage or website that can be viewed using the local computer 17 or the Internet-accessible electronic device(s) 20; (3) displaying a prompt on the website or webpage for inputting user information to the website; (4) displaying a control block 27 on the website or webpage, the control block 27 including a treat button 32 for dispensing the pet treat 35 from the treat dispensing unit 11; (5) initiating a video camera view from the at least one video camera portion 12 on the display on the local computer 17 or the Internet-accessible device 20; (6) displaying at least one delay button 29, 30 on the control block 27 for delaying the pet treat 35 until a specified time if the at least one delay button is selected; and (7) once the treat button 32 has been selected, prompting a signal to be sent to the control circuit electronics portion 42 to initiate the mechanism 38 for sliding the delivery plate, followed by automatically dispensing the pet treat 35 from the treat dispensing unit 11.

As shown in Block 100 of FIG. 21, the present method includes the step of providing a user-accessible treat dispensing website or single page according to the present invention (web address www.dogtreatdispensers.com, for example). The user, who may be a member of a treat dispensing service employing the present method (e.g., at a pet care facility), can access the treat dispensing website at any time of day or night using the Internet 18. The home user can access a treat dispensing apparatus 10 anytime, with no charge.

The local computer 17 in the home or at the pet care facility hosts the webpage to be accessed from the Internet. If it becomes economically feasible at some point in the future for webpages to be hosted elsewhere, that technology is contemplated for use herein instead of using the local computer. At home, the control block and camera view can be on one page minimally. At a pet care facility, which would have a number of pet treat dispensing apparatus 10, multiple pages (control block, camera view) are employed.

As shown in Block 101, a second step includes providing a prompt on the webpage for inputting a security code to access their assigned treat dispensing unit 11. The user's personal computer, laptop computer, smart phone, or any other suitable electronic device 20 suitable for accessing the Internet is used for inputting the security code and any other requested and inputted information. When a member signs up for the system service, he or she is assigned a confidential security code. A pet care facility member preferably signs up for a system service by signing a contract and paying a prescribed monthly fee to belong to the service, and/or a periodic treat fee for the number of dog treats that have been dispensed.

As shown in Block 102, a third step of the present method includes automatically comparing the inputted security code against a member security code database stored in the local computer 17 or website, and either permitting access if the security code is verified, or denying access if the security code is not verified. If the inputted code matches an active code in the member code database, the present dispensing method preferably further includes displaying a "valid code" message, such as "Valid Code Access Granted," as seen in Block 104. If the inputted code does not match a code in the member code database, the dispensing method preferably further includes automatically displaying an "invalid code" message such as "Invalid Code Access Denied," as seen in Block 103.

As seen in Block 105, once the security code is validated, the present treat dispensing method displays a webpage with a control block 27 and camera view. Video camera viewing is preferably linked with treat giving, so that the pet owner 25 may watch the pet 13 receive a treat 35, but it need not be. The present dispensing method may provide a pet treat 35 without being accompanied by camera viewing. If video camera viewing is included, the present system preferably adds the camera view to the webpage with the control block 27 once the security code is authorized. The remote pet location, and the pet 13 in the vicinity of the camera portion 12 of the treat dispensing unit 11, can then be viewed on the screen of the electronic device 20 at the pet owner's remote location.

Preferably, the pet owner 25 can view the pet 13 for as long as he or she wishes, regardless of whether or not the owner elects to dispense a treat 35 to the pet 13. The camera feature provides positive reinforcement for the pet owner when he or she sees the pet respond affirmatively to the treat (by barking, acting excited, wagging the tail, etc.). The pet owner often feels better just being able to see that the dog appears well, particularly if the dog has been sick or is old or very young. In addition to the video cameras at the pet site (see FIG. 3, for example), the pet treat dispensing apparatus 10 optionally includes a second video camera portion 12 at the remote pet owner's location. The camera can be built into the pet owner's electronic device 20. The camera lens 46 of this video camera 26 faces the pet owner at his or her desk, for example, so the dog or other pet can watch the pet owner on a screen/display near the pet. Some dogs respond well to hearing and seeing their owner on a display. The pet owner can view the pet's response on the screen of his or her remote electronic device 20.

Figure 19:
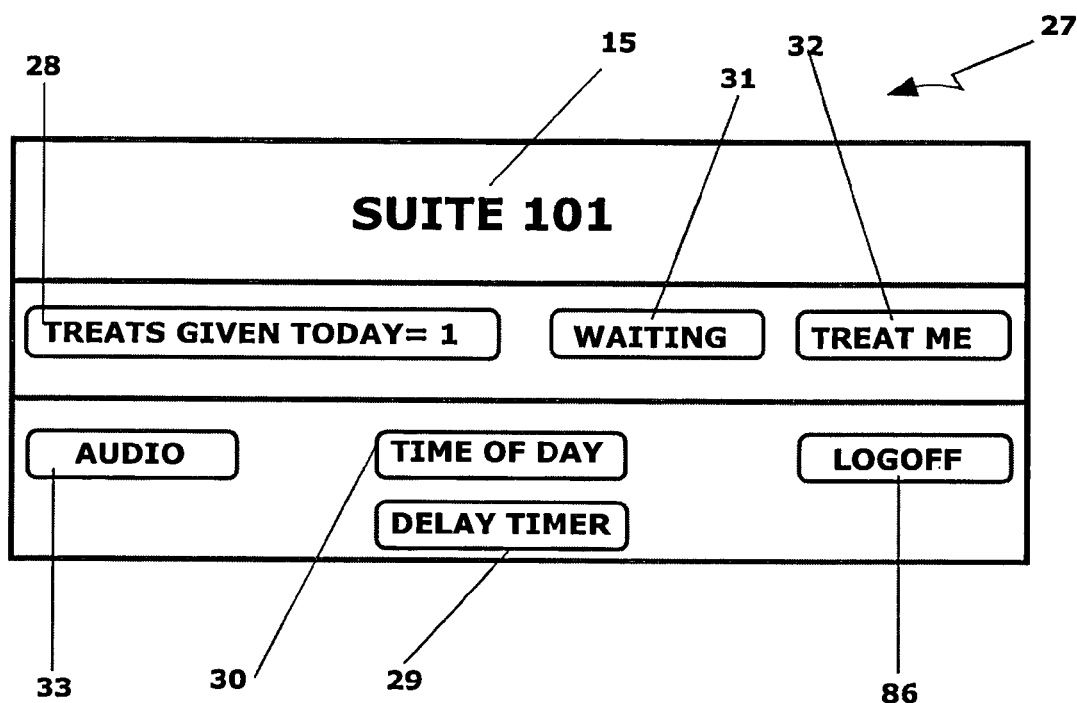
FIG. 19 is a view of an exemplary webpage control block of an Internet-accessible treat dispensing system according to the present invention.

An example of a control block 27 of a webpage is shown in FIG. 19. A hypothetical user's pet kennel 15, called Suite 101, is being displayed. A pet owner 25 would not have access to the treat dispensing unit 11 in anyone else's suite, or be able to use the present treat dispensing system to treat anyone else's pet. The control block for the home user is similar, except without the "Suite 101", since a home ordinarily does not have suites. As seen in FIG. 19, a treat counter 28, preferably labeled "Treats Given Today=", displays the number of treats that have been dispensed in Suite 101 within a 24 hour period. This provides feedback for the pet owner 25, especially where the owner missed watching the pet 13 receive the treat 35 on camera 26. The treat counter 28 also logs daily treat numbers, which can be used for billing the user at the end of the service period.

Continuing with FIG. 21, Block 106, the treat dispensing method of the present invention preferably further includes a prompt for opening one-way (owner to dog) or two-way (owner to dog and dog to owner) communications with the pet 13. As seen in Block 107, if the audio button 33 is selected, either a recorded message is played for the pet, such as "Good Dog, Good Dog!", or the pet owner 25 interacts live with the pet (see FIGS. 5 and 19). This audio feature provides additional positive reinforcement for the dog or other pet, as well as the pet owner when the pet responds affirmatively to the message (by barking, wagging the tail, etc.).

Whether or not the "Audio" button 33 on the control block 27 has been selected, the present dispensing method includes the step of displaying a prompt to use the "delay treat" or "deliver the treat at a specific time" function, as seen in Block 108. This is useful, for example, where the dog has just eaten, or the owner plans to be in a meeting or otherwise tied up at the time the owner wants the treat dispensed. If a time or delay value is entered, the "Treat Me" button will delay distribution of the treat. If a "0" or no value is entered, then a treat will be delivered right away. Alternatively, a separate button is included which, when selected, enables or disables the delay function.

The FIG. 19 control box 27 shows the "Delay Timer" 29 and "Time of Day" 30 buttons, as seen by the user/pet owner. Selecting one of these delay buttons 29, 30 initiates the timing mechanism (Block 109) on the local computer 17 or the control circuit electronics portion 42, and delays the time at which the pet treat 35 will be released. Clicking on the "Time of Day" button 30 results in a prompt being displayed for entering the time of day, as seen in Block 110. Clicking on the "Delay Timer" button 29 results in a prompt being displayed for entering the amount of delay (Block 110).

Alternatively, a "Get treat delayed" button is used to set up a delayed treat event. The user is prompted for the delay time in hours and minutes. An "Enter" button on the prompt sets the timer. This event will be performed only once. To delay an additional pet treat, the process is repeated. The "Get treat time" button is used to set up a delayed treat event as well. However, the user is prompted for the time of day (24 hour clock), such as 9 PM, 21:00. An Enter button on the prompt sets the time. This event will be performed only once. Alternatively, another delay button on the prompt can be used to select which days of the week the event will occur. The event will continue to be performed until the user de-selects all days of the week. At that time, the event is still set, but no days of the week have been selected. This effectively disables the event. Button wording may vary.

Whether or not a timer delay is selected, the present dispensing method importantly includes displaying a treat button on the control box to start the vending, as seen in Block 111. Any suitable words can be used on the buttons and windows herein, as desired. Again referring to FIG. 19, the "Treat Me" button 32 displays the prompt for dispensing a treat from the treat dispensing unit 11. As seen in Block 112, clicking this treat button 32 enables the Internet-controlled pulsed relay 88, resulting in a pet treat falling from the chute 73 after a short time.

The FIG. 19 control block 27 preferably includes a "vending/waiting" indicator 31. Once the treat button 32 has been clicked, the treat dispensing apparatus 10 is enabled, and the "vending/waiting" indicator 31 reads "vending" or the like and changes color, preferably to green. This is the same each time the treat dispensing unit 11 operates, even during delay events. Indicator and window wording and colors may vary. These on-screen signals provide positive reinforcement for the user, indicating when action is underway.

Once the control circuit electronics portion 42 is enabled, the delivery plate 36 moves forward on its guide rails 74 by way of the guide rail assembly 72 from the parked position 44 seen in FIG. 4 to the dispensing position 43, as seen in Block 113 and FIG. 1.

As shown in Block 114, once the treat dispensing unit 11 is in the dispensing position 43, the plate cutouts 40, 41 align and the lowermost pet treat 35a drops out by gravity. The lowermost treat 35a tumbles down the chute 73, where it is available for the pet to retrieve.

As shown in Block 115 in FIG. 21, after a pre-determined amount of time, the treat dispersing method herein includes reversing the delivery plate 36 so that it returns to the parked position 44 seen in FIG. 4. With the delivery plate 36 in the parked position 44, the next lowermost treat 35 drops into the delivery plate cutout 40. Since the plate cutouts 40, 41 are not aligned, no pet treats can be dispersed when the treat dispensing unit 11 is not in the dispensing position 43.

As seen in Block 116, the "vending/waiting" indicator 31 turns red back to and the word "Vending" changes to "Waiting" or the like once the pet treat 35 has been dispensed. The treat counter 28 then goes up by one. The page with the control block 27 is again displayed (Block 105) in case the pet owner wishes to have another treat dispensed, with or without delaying the time of its delivery using the timer delay. Alternatively, the user selects a "Log off" button 86 on the control block 27 (see FIG. 19 and Block 117). Once the user has logged off, the security code is cleared and the dispensing unit 11 remains at rest in the parked position 44. Then the operation ends, per Block 118. The treat dispensing unit 11 always returns to the parked position after dispensing a treat regardless of whether the "Log off" button 86 has been selected. A time delay ensures that the delivery plate 36 goes all the way to the dispensing position plus a little by turning on the K1 relay 58a. Once the timer times out, the K1 relay 58a is turned off and the actuator 50 reverses back until the delivery plate 36 is parked.

The dimensions of the treat rack 34 are based on the size of the pet treats being delivered. The rack dimensions are greater than several treats so as to allow free movement of the treats 35, but the treat rack 34 should not be so big that the treats become twisted or jammed in it. The rack 34 is not compartmentalized. The slot 54 in the front of the treat rack 34 permits easy loading of the treats with the fingers. Treats for use in the treat dispensing unit 11 are preferably substantially flat-sided and stackable, not rough chunks or kibble bits.

A prime advantage of the present invention is its capability to be used by a number of remote, independent users/owners. In a dog day care facility with multiple treat dispensing units 11, for example, any number of owner/users using separate Internet-accessible electronic devices 20 in communication with the local computer 17, or with the control circuit electronics portion 42 of their respective treat dispensing units 11, can order treats for their pups within the same few minutes. For a pet or pets based at home while the pet's family is away, each member of the family (owner) can order treats for the pet(s) using his or her own Internet-accessible electronic device 20.

In addition to the ability to delay the dispensing of the pet treat until later and to communicate with the pet, another advantage of the present apparatus and system is the capacity for both local and remote control of the treat dispensing unit or units 11. In a pet care facility, for example, the remote pet owners can trigger release of the pet treat 35 now or later using their Internet-accessible electronic devices 20, and the computer operator 16, or pet owner 25, can do so at the pet care facility/pet site using the local computer 17, if desired.

From the foregoing it can be realized that the described pet treat dispensing apparatus, system, and method of the present invention may be easily and conveniently utilized for remotely dispensing pet treats. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

BRIEF LIST OF REFERENCE NUMBERS USED
IN THE DRAWINGS 10 pet treat dispensing apparatus
11 treat dispensing unit
12 video camera portion
13 pet
14 pet care facility
15 kennel/suite
16 operator
17 local computer
18 Internet
19 personal computer
20 Internet-accessible electronic device
21 laptop—electronic device
22 Web-enabled phone—electronic device
23 tablet pad—electronic device
24 smart phone—electronic device
25 pet owner
26 video camera
27 control block 28 treat counter
29 Delay Timer button
30 Time of Day delay button
31 vending/waiting indicator
32 treat button
33 audio button
34a treat rack assembly
34 treat rack
35 pet treat
35a lowermost treat
36 delivery plate
37 base plate
38 mechanism for moving delivery plate
39 lower opening of treat rack
40 delivery plate cutout
41 base plate cutout
42 control circuit electronics portion
43 dispensing position
44 parked position
45 half travel position
46 camera lens
47 camera portion antenna
48 Ethernet port
49 camera portion stand
50a actuator assembly
50 actuator
51 front actuator rod
52 front actuator foot
53 rear actuator foot
54 rack slot
55 rack rear wall
56 mounting bracket
57 wire feed hole
58a relay K1
58b relay K2
59 fuse holder
60 wire terminal blocks
61 pet crate
62 push button switch
63 hinge on lid
64 lid door stay
65 housing lid
66 thumbscrew nut
67 L-shaped bracket
68 metal plate—proximity sensor
69 proximity sensor
70 lever operated switch
71 handle on housing
72 guide rail assembly
73 chute
74 guide rail
75 unit housing
76 wall/vertical surface
77 manual load switch
78 screw stud
79 screw
80 rack side wall spacer
81 rack insert
82 AC plug in transformer
83 a,b rack rear wall spacers
84 positioning stop
85 chute front opening
86 log off button
87 proximity circuit
88 Internet-controlled pulsed relay
89 manual load switch contact
90 front end of lid
91 front end of unit housing
92 chute upper opening
93 audio portion
94 microphone
95 speaker
96 recording device
97 actuator housing
98 hollow standoff
99 actuator drive shaft
100 guide rail slot
101 guide rail assembly base
102 upper shoulders
103 pins on feet
104 chute "L" flanges
105 preset limit switch
106 guide rail block
107 actuator motor
108 top connecting plate
109 notch
110 dispensing system
111 DDNS router
112 video camera portion speaker

What is claimed is:

1. A method for remotely dispensing a pet treat using a Internet-accessible pet treat dispensing apparatus, the pet treat dispensing method comprising the following steps:
   (1) providing at a pet site at least one Internet-accessible pet dispensing apparatus comprising: (a) a treat dispensing unit comprising a slidable delivery plate, a stationary base plate below the delivery plate, and a mechanism for sliding the delivery plate over the base plate; (b) a control circuit electronics portion attached to the treat dispensing unit, the control circuit electronics portion being in communication with the mechanism for sliding the delivery plate and with a router or a local computer at the pet site, the router or local computer being in communication with at least one remote Internet-accessible electronic device; and (c) at least one video camera portion in communication with the local computer or the control circuit electronics portion;
   (2) providing a user-accessible webpage or website that can be viewed using the local computer or the at least one Internet-accessible electronic device;
   (3) displaying a prompt on the webpage or website for inputting user information to the website;
   (4) displaying a control block on the webpage or website, the control block comprising a treat button for dispensing the pet treat from the treat dispensing unit;
   (5) initiating a video camera view from the at least one video camera portion on the display on the local computer or the at least one Internet-accessible device;
   (6) displaying at least one delay button on the control block for delaying the pet treat until a specified time if the at least one delay button is selected; and
   (7) once the treat button has been selected, prompting a signal to be sent to the control circuit electronics portion to initiate the mechanism for sliding the delivery plate, followed by automatically dispensing the pet treat from the treat dispensing unit.

2. The pet treat dispensing method according to claim 1, wherein the step of providing a prompt on the user-accessible website or webpage for inputting user information comprises requesting a user security code, which, after the security code is inputted, is followed by the steps of: comparing the inputted security code to a code database stored in the user-accessible website or webpage, and either permitting access to the user-accessible website or webpage if the security code is verified, or denying access to the user-accessible website or webpage if the security code is not verified.

3. The pet treat dispensing method according to claim 2, further comprising, once the at least one delay button is selected, the next step of: initiating a timing mechanism on the local computer or control circuit electronics portion, and then, once a selected time delay has lapsed, the step of: prompting the signal to the control circuit electronics portion to initiate the mechanism for sliding the delivery plate.

4. The pet treat dispensing method according to claim 3, further comprising, once the at least one delay button is selected, the next step of: providing on the control block a time of day delay button for selecting a time of day, and a delay time button for selecting the amount of the time delay.

5. The pet treat dispensing method according to claim 1, further comprising the step, after step (3), of: displaying an audio button for opening one-way or two-way audio communications with a pet at the pet site.

6. The pet treat dispensing method according to claim 5, further comprising, once the audio button for one-way audio communication with the pet has been selected, the step of: playing a pre-recorded message on at least one speaker on the treat dispensing unit at the pet site.

7. The pet treat dispensing method according to claim 1, further comprising the step, after step (4), of: displaying a vending/waiting indicator on the control block, which changes color and displays a word message indicating that the pet treat is being dispensed, once the treat button has been selected.

8. The pet treat dispensing method according to claim 7, further comprising the next step, once the pet treat has been dispensed, of: automatically changing the vending/waiting indicator back to its original color and displaying a word message indicating that the pet treat is no longer being dispensed.

9. The pet treat dispensing method according to claim 1, further comprising the step, after step (4), of: displaying a treat counter on the control block, which increases by one each time a pet treat is dispensed from the treat dispensing unit.

10. The pet treat dispensing method according to claim 1, further comprising the step after step (7) of: displaying the control block again once the pet treat has been dispensed.

11. The pet treat dispensing method according to claim 1, wherein the router has a built-in Dynamic Domain Name System client, the built-in Dynamic Domain Name System client router being connected to the treat dispensing unit and to the at least one video camera portion, with no local computer.

12. The pet treat dispensing method according to claim 1, wherein the control circuit electronics portion is in communication with the local computer at the pet site, the local computer being in communication with the at least one remote Internet-accessible electronic device, and with the at least one video camera portion.

13. A pet treat dispensing system comprising at least two pet treat dispensing apparatus, the pet treat dispensing system comprising:
(a) at least two treat dispensing units operating independently of one another, one for each pet treat dispensing apparatus, each treat dispensing unit comprising a treat rack for storing a plurality of pet treats, a slidable delivery plate, a stationary base plate, and a mechanism for sliding the slidable delivery plate over the stationary base plate, a lower opening of the treat rack being positioned over a delivery plate cutout in the slidable delivery plate, the stationary base plate comprising a base plate cutout, each of the treat dispensing units comprising at least a dispensing position wherein the plate cutouts are aligned, and a parked position wherein the plate cutouts are not aligned;
(b) a control circuit electronics portion attached to each of the treat dispensing units, each of the control circuit electronics portions comprising an Internet-controlled relay connected to the delivery plate sliding mechanism of the treat dispensing unit;
(c) an Internet-accessible local computer in communication with the control circuit electronics portions, and with at least one remote Internet-accessible electronic device; and
(d) a video camera portion in communication with the local computer or with the Internet-accessible electronic device; wherein the circuit control electronic portion further comprises a timing mechanism for delaying release of the pet treat by the treat dispensing unit, and wherein the mechanism for sliding the delivery plate comprises an actuator, the actuator being controllable by the Internet-controlled relay.

14. The pet treat dispensing system according to claim 13, wherein the control circuit electronics portion further comprises a K1 relay and a manual load switch, a contact of which feeds to the K1 relay; wherein activation of the manual load switch causes the delivery plate to slide to the dispensing position.

15. A pet treat dispensing system comprising at least two pet treat dispensing apparatus, the pet treat dispensing system comprising: (a) at least two treat dispensing units operating independently of one another, one for each pet treat dispensing apparatus, each treat dispensing unit comprising a treat rack for storing a plurality of pet treats, a slidable delivery plate, a stationary base plate, and a mechanism for sliding the delivery plate over the base plate, a lower opening of the treat rack being positioned over a delivery plate cutout in the delivery plate, the base plate comprising a base plate cutout, each of the treat dispensing units comprising at least a dispensing position wherein the plate cutouts are aligned, and a parked position wherein the plate cutouts are not aligned; (b) a control circuit electronics portion attached to each of the treat dispensing units, each of the control circuit electronics portions comprising an Internet-controlled relay connected to the delivery plate sliding mechanism of the treat dispensing unit; (c) an Internet-accessible local computer in communication with the control circuit electronics portions, and with at least one remote Internet-accessible electronic device; and (d) a video camera portion in communication with the local computer or with the Internet-accessible electronic device; and (e) a guide rail assembly on opposite longitudinal sides of the delivery plate; wherein the guide rail assembly comprises two substantially mirror image portions, each portion of the guide rail assembly comprising a guide rail, a base, and a top connecting plate, the guide rail and the base of each portion of the guide rail assembly being connected together by the top connecting plate, the guide rails of each guide rail assembly portion being substantially parallel to one another, the base of each portion of the guide rail assembly being attached to the base plate.

16. The treat dispensing system according to claim 15, wherein each guide rail assembly further comprises at least one guide rail block, which comprises upper shoulders that fit into, and are slideable along, a slot in the guide rail, the delivery plate being slidable along the guide rail assembly.

* * * * *